(12) United States Patent
Urabe et al.

(10) Patent No.: US 6,181,749 B1
(45) Date of Patent: Jan. 30, 2001

(54) DIVERSITY RECEPTION APPARATUS

(75) Inventors: Yoshio Urabe, Shijonawate; Hitoshi Takai, Toyono; Hidetoshi Yamasaki, Amagasaki; Kenichi Mori, Ibaraki, all of (JP)

(73) Assignee: Matsushita Electric Industrial Co., Ltd., Osaka-fu (JP)

( * ) Notice: Under 35 U.S.C. 154(b), the term of this patent shall be extended for 0 days.

(21) Appl. No.: 09/182,063

(22) Filed: Oct. 29, 1998

(30) Foreign Application Priority Data

Oct. 31, 1997 (JP) ............................................ 9-300145
Apr. 14, 1998 (JP) ............................................ 10-102330

(51) Int. Cl.[7] ................................ H04B 7/08; H04L 1/06
(52) U.S. Cl. ........................ 375/267; 375/347; 455/135; 455/278.1
(58) Field of Search .................................. 375/267, 347; 455/135, 278.1

(56) References Cited

U.S. PATENT DOCUMENTS

| 5,216,676 |   | 6/1993 | Kimura . |         |
|-----------|---|--------|----------|---------|
| 5,339,334 | * | 8/1994 | Baghdady | 375/100 |
| 5,504,774 |   | 4/1996 | Takai et al. . | |
| 6,937,005 | * | 8/1999 | Obuchi et al. | 375/224 |

FOREIGN PATENT DOCUMENTS

| 0 772 329 | 5/1997  | (EP) . |
| 1-39842   | 2/1989  | (JP) . |
| 1-265739  | 10/1989 | (JP) . |
| 2-189042  | 7/1990  | (JP) . |
| 4-8031    | 1/1992  | (JP) . |
| 6-77941   | 3/1994  | (JP) . |
| 91/18458  | 11/1991 | (WO) . |

OTHER PUBLICATIONS

A Consideration of 'Error–Correcting and Combining' Method in SR–chirp, Scheme, Yoshio Urabe et al., Technical Report of IEICE, CS98–33, May 1998.

* cited by examiner

Primary Examiner—Amanda T. Le
(74) Attorney, Agent, or Firm—Wenderoth, Lind & Ponack, L.L.P.

(57) ABSTRACT

A demodulator 1 obtains demodulated data in a plurality of channels. Estimating portions 2a and 2b estimate and output the numbers of erroneous symbols and error locations thereof in the demodulated data. A data comparator 3 compares the demodulated data corresponding to the error locations with the demodulated data in the corresponding locations in other channels to determine whether the error location is correct, and it outputs a decision signal in response to the determination. A data selector 4 selects one of the demodulated data in the plurality of channels on the basis of the numbers of erroneous symbols and the decision signals and outputs the data as selected data. It is then possible to maintain the reliability of error detection even when a less redundant short error detecting code is used, and also to accurately select a channel of good quality even when the demodulated data in all channels contain the same extent of errors.

36 Claims, 18 Drawing Sheets

F I G. 4

DIVERSITY RECEPTION APPARATUS

BACKGROUND OF THE INVENTION

1. Field of the Invention

The present invention relates to a diversity reception apparatus which, in digital radio communications and the like, takes out demodulated data in two or more channels from one or a plurality of modulated signals and selects and combines the data to reduce transmission errors.

2. Description of the Background Art

In radio communications, especially in mobile communication, the diversity reception is widely used to reduce transmission errors caused by fading and interference.

In a typical method of the diversity reception, a signal at the highest reception signal strength is selected from among a plurality of channels of signals received at a plurality of antennas. However, in the presence of interference or multipath, error may occur even if the reception signal strength is high. Then a channel of signal of good quality cannot be correctly selected only with the reception signal strength. Conventionally, in order to solve this problem, Japanese Patent Laid-Open No. 1-265739 and Japanese Patent Laid-Open No. 4-8031 propose diversity reception apparatus which can detect errors in received data to select a channel containing the smallest number of errors. Such conventional diversity reception apparatus will now be described referring to the drawing.

FIG. 17 is a block diagram showing the structure of a conventional diversity reception apparatus. As shown in FIG. 17, this diversity reception apparatus has antennas 101a and 101b, receivers 102a and 102b, error detectors 103a and 103b, an error comparator 104, and a data selector 105. The receivers 102a and 102b demodulate signals received at the antennas 101a and 101b to output demodulated data d100a and d100b, respectively. The error detectors 103a and 103b respectively detect errors in the demodulated data d100a and d100b and count the numbers of errors. The error comparator 104 receives and compares the numbers of errors outputted from the error detectors 103a and 103b and outputs a selection signal s100 for selecting one of the demodulated data d100a and d100b containing less errors. The data selector 105 selects the one with less errors from the demodulated data d100a and d100b on the basis of the selection signal s100 from the error comparator 104 and outputs it as a selected signal d101. With this operation, the diversity reception apparatus shown in FIG. 17 can select demodulated data with less errors from the signals received at the two channels of antennas.

However, the diversity reception apparatus with the above-described structure requires use of a highly redundant error detecting code or a long error detecting code to correctly detect errors. The use of a long error detecting code reduces the selecting rate and then it is impossible to follow a rapid change on the transmission path caused by fast fading, for example. However, the use of a highly redundant error detecting code reduces the data transmission efficiency. Further, if error correcting coding is used to improve the reliability, the redundancy further increases. Moreover, if the demodulated data in all channels include errors to the same extent, it is impossible to determine which channel of demodulated data has the best quality.

SUMMARY OF THE INVENTION

Accordingly, an object of the present invention is to provide a diversity reception apparatus which performs error estimation by using an error correcting code so as to maintain the reliability of the error estimation even when a less redundant and short code is used, and to accurately compare qualities of demodulated data even when demodulated data in all channels contain errors to a similar extent, so that a channel of good quality can accurately be selected. Another object of the present invention is to improve the reliability by error correction without increasing the redundancy, together with diversity selection.

To achieve the objects above, the present invention has the features shown below.

A first aspect of the present invention is directed to a diversity reception apparatus receiving one or a plurality of modulated signals modulated with error-correctably coded data. According to the first aspect, the diversity reception apparatus comprises:

a demodulator for demodulating the modulated signal(s) to obtain demodulated data in a plurality of channels corresponding to the coded data;

an error estimating portion for estimating the number of erroneous symbols and error locations thereof in the demodulated data in each channel;

a data comparator for comparing the data in the error locations estimated in the demodulated data in each channel with the data in the corresponding locations in the demodulated data in other channels to determine whether the error locations are correct or not; and a data selector for selecting one of the plurality of channels on the basis of the numbers of erroneous symbols and results of the determination made by the data comparator.

In accordance with the above-described first aspect, the demodulated data are compared among channels to determine whether the error locations are correct. Accordingly, the reliability of the error estimation can be maintained even when a less redundant and short code is used, and a channel of good quality can be selected even when the demodulated data in all channels contain the same extent of errors.

According to a second aspect of the present invention, in the diversity reception apparatus of the first aspect, when all data in the error locations estimated in the demodulated data in one channel of the plurality of channels respectively differ from the data in the corresponding locations in the demodulated data in all other channels, the data comparator determines that the error locations in the one channel are correct.

In accordance with the above-described second aspect, it is possible to determine whether the estimated error locations in each channel are correct on the basis of data comparison with simple structure.

According to a third aspect of the present invention, in the diversity reception apparatus of the first aspect, when all data in the error locations estimated in the demodulated data in one channel of the plurality of channels respectively differ from the data in the corresponding locations in the demodulated data in at least one of other channels, the data comparator determines that the error locations in the one channel are correct.

In accordance with the above-described third aspect, it is possible to determine whether the estimated error locations in each channel are correct by data comparison with simple structure.

According to a fourth aspect of the present invention, in the diversity reception apparatus of the first aspect, when data whose number is equal to or larger than a predetermined threshold in the data in the error locations estimated in the demodulated data in one channel of the plurality of channels differ from the data in the corresponding locations in the demodulated data in at least one of other channels, the data comparator determines that the error locations in the one channel are correct.

In accordance with the above-described fourth aspect, the determination by data comparison about the correctness of the error estimation can be made more flexibly by setting the threshold value.

According to a fifth aspect of the present invention, in the diversity reception apparatus of the first aspect, the error estimating portion estimates the error locations in the demodulated data in each channel bit by bit, and when all bits in the error locations estimated in the demodulated data in one channel of the plurality of channels respectively differ from the bits in the corresponding locations in the demodulated data in at least one of other channels, the data comparator determines that the error locations in the one channel are correct.

According to a sixth aspect of the present invention, in the diversity reception apparatus of the first aspect, the error estimating portion estimates the error locations in the demodulated data in each channel bit by bit, and when bits whose number is equal to or larger than a predetermined threshold in the bits in the error locations estimated in the demodulated data in one channel of the plurality of channels differ from the bits in the corresponding locations in the demodulated data in at least one of other channels, the data comparator determines that the error locations in the one channel are correct.

According to a seventh aspect of the present invention, the diversity reception apparatus of the fifth aspect further comprises a bit inverter for inverting the bits in the error locations in the demodulated data in the channel selected by the data selector when the number of erroneous symbols is equal to or smaller than a given value.

In accordance with the above-described seventh aspect, the bit inversion is performed to correct errors on the basis of the estimated result about the number of erroneous symbols and the error locations thereof which were used for selection. Accordingly transmission errors can be reduced by effects of both of diversity selection and error correction with low redundancy and simple structure.

According to an eighth aspect of the present invention, in the diversity reception apparatus of the seventh aspect, the bit inverter does not perform the bit inversion when the number of erroneous symbols exceeds the given value.

In accordance with the above-described eighth aspect, the bit inversion is not performed when the number of erroneous symbols exceeds a given value, which prevents an increase of errors due to miscorrection.

According to a ninth aspect of the present invention, in the diversity reception apparatus of the first aspect, the data selector selects a channel in which the number of erroneous symbols is the smallest.

In accordance with the above-described ninth aspect, more reliable selection can be made than in diversity selection using error detection.

According to a tenth aspect of the present invention, in the diversity reception apparatus of the first aspect, when the numbers of erroneous symbols are the smallest in a plurality of the channels, the data selector selects a channel in which the error locations are determined to be correct by the data comparator from among the plurality of the channels in which the numbers of erroneous symbols are the smallest.

In accordance with the above-described tenth aspect, a more reliable channel can be selected when a plurality of channels contain the smallest number of erroneous symbols.

According to an eleventh aspect of the present invention, in the diversity reception apparatus of the first aspect, when the numbers of erroneous symbols are equal in all channels, the data selector selects a channel in which the error locations are determined to be correct by the data comparator.

In accordance with the above-described eleventh aspect, the selection can be made reliably even when there is no difference among the numbers of erroneous symbols.

According to a twelfth aspect of the present invention, in the diversity reception apparatus of the first aspect, the number of the channels of the demodulated data is two, and when the numbers of erroneous symbols are equal in the two channels and the error locations in the two channels are both determined to be correct by the data comparator, the data selector maintains the preceding selection.

In accordance with the above-described twelfth aspect, the selection made in the previous time is maintained when it is impossible to determine which channel has the best quality. A reliable selection can be made by using the previous information when an error is occurring due to a factor having continuity in time such as fading and continual noise.

According to a thirteenth aspect of the present invention, in the diversity reception apparatus of the first aspect, the number of the channels of the demodulated data is two, and when the numbers of erroneous symbols are equal in the two channels and the error locations in the two channels are both determined to be incorrect by the data comparator, the data selector maintains the preceding selection.

In accordance with the above-described thirteenth aspect, like in the twelfth aspect, the selection made in the previous time is maintained when a determination cannot be made as to which channel has the best quality. Then it is possible to make reliable selection by using the previous information when an error is occurring due to a factor having continuity in time such as fading and continual noise.

According to a fourteenth aspect of the present invention, in the diversity reception apparatus of the first aspect, when the data comparator determines that the error locations in a plurality of the channels are correct, the data selector selects a channel in which the number of erroneous symbols is the smallest from among the plurality of the channels in which the error locations are determined to be correct.

In accordance with the above-described fourteenth aspect, more reliable selection can be made when the estimated error locations are determined to be correct in a plurality of channels.

According to a fifteenth aspect of the present invention, in the diversity reception apparatus of the first aspect, when the data comparator determines that all of the error locations in each of the channels are not correct, the data selector selects a channel in which the number of erroneous symbols is the smallest.

In accordance with the above-described fifteenth aspect, a reliable channel can be selected even when the error locations estimated in all of the channels are incorrect.

According to a sixteenth aspect of the present invention, in the diversity reception apparatus of the first aspect, the error estimating portion estimates the number of erroneous symbols and error locations thereof for each block defined by dividing the demodulated data in each channel to given length, and the data selector selects one of the plurality of channels for each block.

In accordance with the above-described sixteenth aspect, the selection is made block by block. Accordingly, even if an error remains, the error affects only within the block, without affecting other blocks.

According to a seventeenth aspect of the present invention, the diversity reception apparatus of the first aspect further comprises a data detector for determining whether the demodulated data in each of the plurality of channels is valid or invalid, and the data selector selects one of the channels determined to be valid by the data detector from among the plurality of channels.

In accordance with the above-described seventeenth aspect, a determination is made as to whether data is valid. This prevents the malfunction of accidentally determining received noise as error-free data.

According to an eighteenth aspect of the present invention, in the diversity reception apparatus of the seventeenth aspect, the data detector is a unique word detector for detecting particular data pattern in the demodulated data.

In accordance with the above-described eighteenth aspect, it is determined whether demodulated data in a plurality of channel are valid or invalid by using particular data pattern. Accordingly, similarly to the seventeenth aspect, it is possible to prevent the malfunction of accidentally determining received noise to be error-free data.

According to a nineteenth aspect of the present invention, in the diversity reception apparatus of the first aspect, the modulated signal is a chirp PSK signal obtained by multiplying the phase-shift keying signal by a chirp signal whose frequency is swept at the same period as the symbol period, and the demodulator includes a subband filter for extracting part of the band of the modulated signal and a differential detector for differentially detecting an output of the subband filter.

In accordance with the above-described nineteenth aspect, it is possible to perform diversity reception in which a plurality of channels of demodulated data are obtained from the same modulated signal received at the same antenna.

A twentieth aspect of the present invention is directed to a diversity reception apparatus receiving one or a plurality of modulated signals modulated with error correctably coded data. According to the twentieth aspect, the diversity reception apparatus comprises:

a demodulator for demodulating the modulated signal(s) to obtain demodulated data in a plurality of channels corresponding to the coded data;

an error correcting portion for estimating the number of erroneous symbols and error locations thereof in the demodulated data in each channel, and for correcting an error in the demodulated data in each channel on the basis of the error locations and outputting the error-corrected demodulated data as decoded data;

a data comparator for comparing the data in the error locations estimated in the decoded data in each channel with the data in the corresponding locations in the decoded data in other channels to determine whether the error locations are correct or not; and a data selector for selecting one of the plurality of channels on the basis of the numbers of erroneous symbols and results of the determination made by the data comparator.

In accordance with the above-described twentieth aspect, decoded data is obtained by performing error correction at the same time as error estimation, and whether the error locations are correct is determined by comparing the decoded data among channels. Accordingly, even when a less redundant and short code is used, the reliability of the error estimation can be maintained, and even if all channels of demodulated data contain the same extent of errors, a channel of good quality can be selected.

According to a twenty-first aspect of the present invention, in the diversity reception apparatus of the twentieth aspect, when all data in the error locations estimated in the decoded data in one channel of the plurality of channels are respectively equal to the data in the corresponding locations in the decoded data in all other channels, the data comparator determines that the error locations in the one channel are correct.

According to a twenty-second aspect of the present invention, in the diversity reception apparatus of the twentieth aspect, when all data in the error locations estimated in the decoded data in one channel of the plurality of channels are respectively equal to the data in the corresponding locations in the decoded data in at least one of other channels, the data comparator determines that the error locations in the one channel are correct.

According to a twenty-third aspect of the present invention, in the diversity reception apparatus of the twentieth aspect, when data whose number is equal to or larger than a predetermined threshold in the data in the error locations estimated in the decoded data in one channel of the plurality of channels are equal to the data in the corresponding locations in the decoded data in at least one of other channels, the data comparator determines that the error locations in the one channel are correct.

According to a twenty-fourth aspect of the present invention, in the diversity reception apparatus of the twentieth aspect, the error correcting portion does not perform the error correction when the number of erroneous symbols exceeds a given value.

According to a twenty-fifth aspect of the present invention, in the diversity reception apparatus of the twentieth aspect, the data selector selects a channel in which the number of erroneous symbols is the smallest.

According to a twenty-sixth aspect of the present invention, in the diversity reception apparatus of the twentieth aspect, when the numbers of erroneous symbols are the smallest in a plurality of the channels, the data selector selects a channel in which the error locations are determined to be correct by the data comparator from among the plurality of the channels in which the numbers of erroneous symbols are the smallest.

According to a twenty-seventh aspect of the present invention, in the diversity reception apparatus of the twentieth aspect, when the numbers of erroneous symbols are equal in all channels, the data selector selects a channel in which the error locations are determined to be correct by the data comparator.

According to a twenty-eighth aspect of the present invention, in the diversity reception apparatus of the twentieth aspect, the number of the channels of the demodulated data is two, and when the numbers of erroneous symbols are equal in the two channels and the error locations in the two channels are both determined to be correct by the data comparator, the data selector maintains the preceding selection.

According to a twenty-ninth aspect of the present invention, in the diversity reception apparatus of the twentieth aspect, the number of the channels of the demodulated data is two, and when the numbers of erroneous symbols are equal in the two channels and the error locations in the two channels are both determined to be incorrect by the data comparator, the data selector maintains the preceding selection.

According to a thirtieth aspect of the present invention, in the diversity reception apparatus of the twentieth aspect, when the data comparator determines that the error locations in a plurality of the channels are correct, the data selector selects a channel in which the number of erroneous symbols is the smallest from among the plurality of the channels in which the error locations are determined to be correct.

According to a thirty-first aspect of the present invention, in the diversity reception apparatus of the twentieth aspect, when the data comparator determines that the error locations are incorrect in all channels, the data selector selects a channel in which the number of erroneous symbols is the smallest.

According to a thirty-second aspect of the present invention, in the diversity reception apparatus of the twentieth aspect, the error correcting portion estimates the number of erroneous symbols and error locations thereof for each block defined by dividing the demodulated data in each channel to given length, and the data selector selects one of the plurality of channels for each block.

According to a thirty-third aspect of the present invention, the diversity reception apparatus of the twentieth aspect further comprises a data detector for determining whether the demodulated data in each of the plurality of channels is valid or invalid, and the data selector selects one of the channels determined to be valid by the data detector from among the plurality of channels.

According to a thirty-fourth aspect of the present invention, in the diversity reception apparatus of the thirty-third aspect, the data detector is a unique word detector for detecting particular data pattern in the demodulated data.

According to a thirty-fifth aspect of the present invention, in the diversity reception apparatus of the twentieth aspect, the modulated signal is a chirp PSK signal obtained by multiplying a phase-shift keying signal by a chirp signal whose frequency is swept at the same period as the symbol period, and the demodulator includes a subband filter for extracting part of the band of the modulated signal and a differential detector for differentially detecting an output of the subband filter.

A thirty-sixth aspect of the present invention is directed to a diversity reception apparatus receiving one or a plurality of modulated signals modulated with error correctably coded data. According to the thirty-sixth aspect, the diversity reception apparatus comprises:

a demodulator for demodulating the modulated signal(s) to obtain demodulated data in a plurality of channels corresponding to the coded data;

an error estimating portion for estimating an error location in the demodulated data in each channel;

a data comparator for comparing the data in the error location estimated in the demodulated data in each channel with the data in the corresponding location in the demodulated data in other channels to determine whether the error location is correct or not; and a data selector for selecting a channel in which the error location is determined to be correct by the data comparator from among the plurality of channels.

In accordance with the above-described thirty-sixth aspect, demodulated data are compared among channels to determine whether the error locations are correct. Accordingly, the reliability of the error estimation can be maintained even when a less redundant and short code is used, which enables reliable selection of channels.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing the contents of the data memory portions shown in FIG. 3 in the first embodiment.

DESCRIPTION OF THE PREFERRED EMBODIMENTS (First Embodiment)

Figure 1:
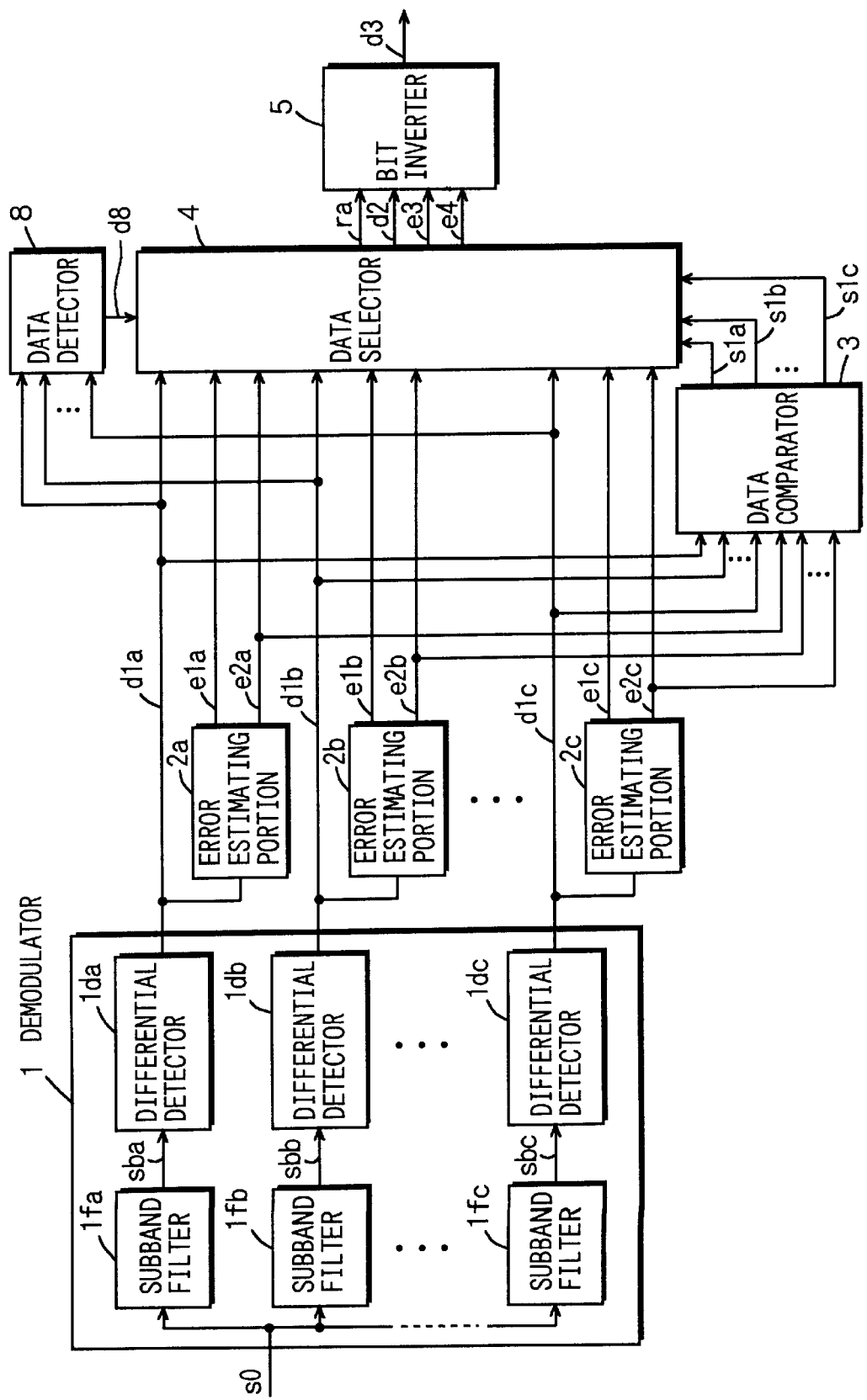
FIG. 1 is a block diagram showing the structure of a diversity reception apparatus according to a first embodiment of the present invention.

FIG. 1 is a block diagram showing a diversity reception apparatus according to a first embodiment of the present invention. As shown in FIG. 1, this diversity reception apparatus has a demodulator 1, error estimating portions 2a and 2b, a data comparator 3, a data selector 4, a bit inverter 5, and a data detector 8. The demodulator 1 receives a modulated signal s0 as input. The modulated signal s0 is a chirp PSK signal obtained by multiplying a phase-shift keying (PSK) signal by a chirp signal whose frequency is swept at the same period as the symbol period, which is the same as the modulated signal disclosed in FIG. 12 in U.S. Pat. No. 5,504,774, which is incorporated herein by reference. The demodulator 1 operates similarly to the demodulator in the receiving apparatus disclosed in U.S. Pat. No. 5,504,774, which is a subband demodulator including at least two channels of subband filters and at least two channels of differential detectors. In the description hereinafter, it is assumed that the demodulator 1 includes two channels of subband filters 1fa and 1fb and two channels of differential detectors 1da and 1db.

The subband filters 1fa and 1fb both receive the modulated signal s0 as their inputs, extract signals in different subbands, and output them as subband signals sba and sbb, respectively. The differential detectors 1da and 1db respectively receive the subband signals sba and sbb and perform differential detection and data demodulation to output first-channel demodulated data d1a and second-channel demodulated data d1b, respectively. The data for modulating a carrier into the modulated signal is coded by BCH coding in advance, as will be described later.

The error estimating portion 2a receives the demodulated data d1a, and estimates the number of erroneous symbols and the error locations in the demodulated data d1a by using properties of the BCH code. Then, the error estimating portion 2a outputs an erroneous symbol number e1a and error locations e2a. Each of the error locations e2a represents the position of an estimated erroneous symbol in the demodulated data d1a. Similarly, the error estimating portion 2b receives the demodulated data d1b, estimates the number of erroneous symbols and the error locations in the demodulated data d1b, and then outputs thus estimated erroneous symbol number e1b and error locations e2b.

The data detector 8 detects unique words described later for the demodulated data d1a and d1b to determine whether they include valid data and outputs the detection result d8. The detection result d8 is a signal indicating three states: a state in which both of first and second channels are valid, a state in which only the first channel is valid, and a state in which only the second channel is valid.

The data comparator 3 compares data corresponding to the error locations e2a in the demodulated data d1a with data in the corresponding locations in the demodulated data d1b to output a decision signal s1a, and also compares data corresponding to the error locations e2b in the demodulated data d1b with data in the corresponding locations in the demodulated data d1a to output a decision signal s1b.

When the detection result d8 outputted from the data detector 8 indicates the state in which the first and second channels are both valid, the data selector 4 selects one of the demodulated data d1a and d1b on the basis of the erroneous symbol numbers e1a and e1b and the decision signals s1a and s1b, and then outputs it as selected data d2. It also selects the erroneous symbol number and error locations of the same channel as the selected demodulated data and outputs them as a selected erroneous symbol number e3 and selected error locations e4, respectively. It also outputs address "ra" described later. When the detection result d8 outputted from the data detector 8 indicates a state in which only one of the channels is valid, the channel which contains valid data is selected, independently of the erroneous symbol numbers and error locations. The bit inverter 5 inverts erroneous bits in the selected data d2 on the basis of the selected erroneous symbol number e3, selected error locations e4, and address ra, to correct errors in the selected data d2 and then it outputs decoded data d3.

Figure 2:
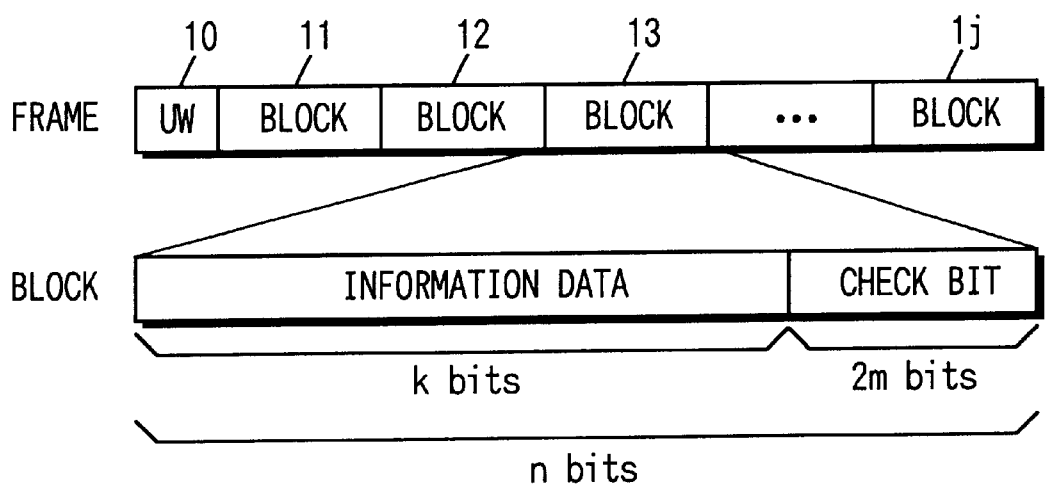
FIG. 2 is a diagram showing the data structure of data for modulating a carrier into a modulated signal in the first embodiment.

The data for modulating a carrier into the modulated signal is structured on the basis of the unit frame structure shown in FIG. 2. That is to say, this frame has a unique word 10 for detection of the head of valid data at its beginning, which is followed by j blocks 11, 12, . . . , 1j each formed of n-bit data. Each of the j blocks is a binary BCH code capable of 2-bit error correction, which includes k bits of information data and 2 m bits of redundant data. The numbers n, k and m are integers in the relation of n=k+2 m. It is of course possible to use a code capable of correction of 3 or more bits as the error correcting code.

The error estimating portions 2a and 2b shown in FIG. 1 each perform syndrome calculation of the BCH code and estimate the numbers of erroneous symbols and the error locations from the calculated results, which can be realized with the same structure as part of the BCH error correcting device shown in U.S. Pat. No. 5,216,676, for example. As is well known, the 2-bit error correcting BCH code can detect four kinds of error states: no error, 1-bit error, 2-bit error, and 3-or more-bit error, from its properties. In the case of an error of 2 bits or less, it is possible to calculate the locations of the erroneous bits. However, when an error of 3 or more bits occurs, it may not be distinguished from an error of 2 bits or less, and then it may be miscorrected.

Figure 3:
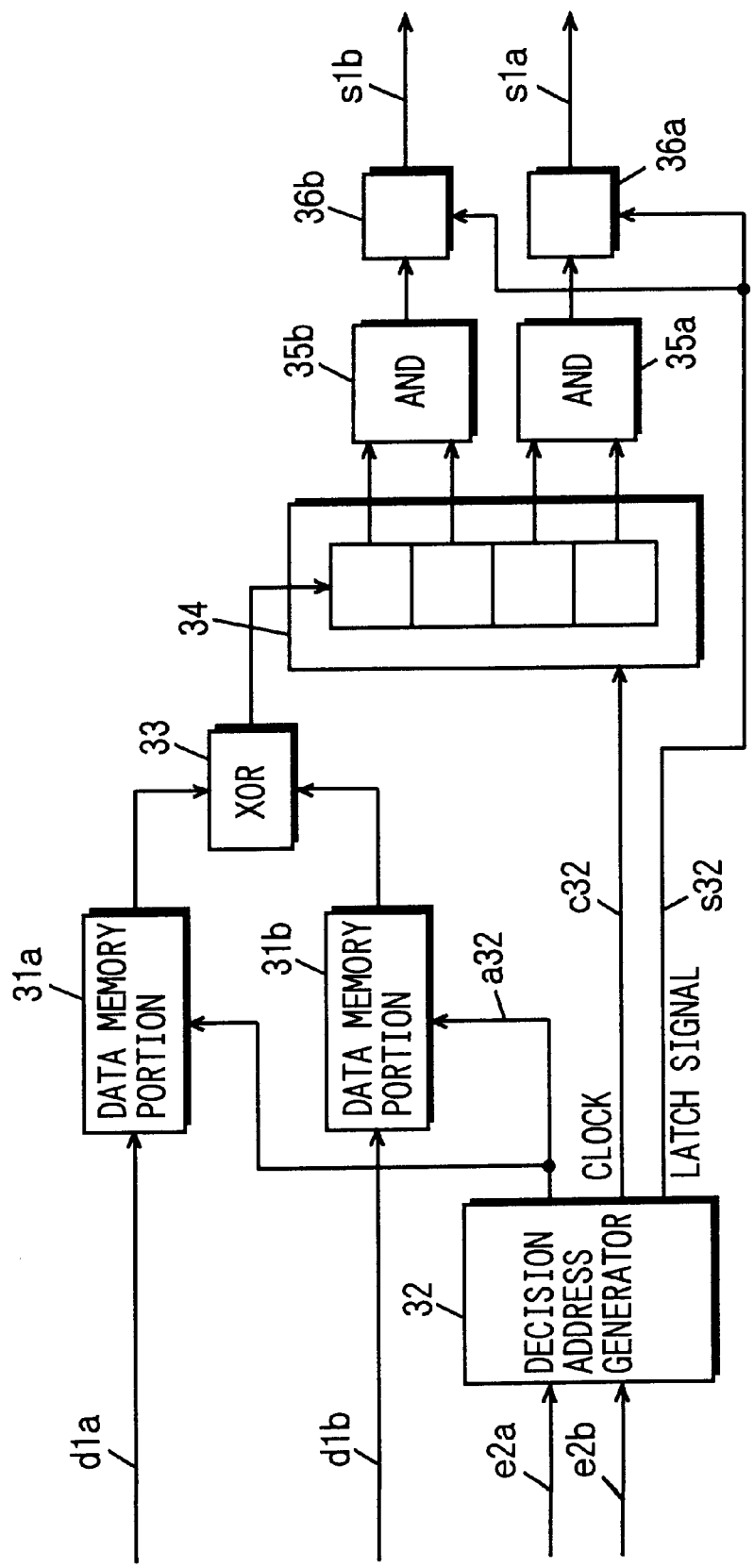
FIG. 3 is a block diagram showing a structure of the data comparator in the first embodiment.
Figure 5:
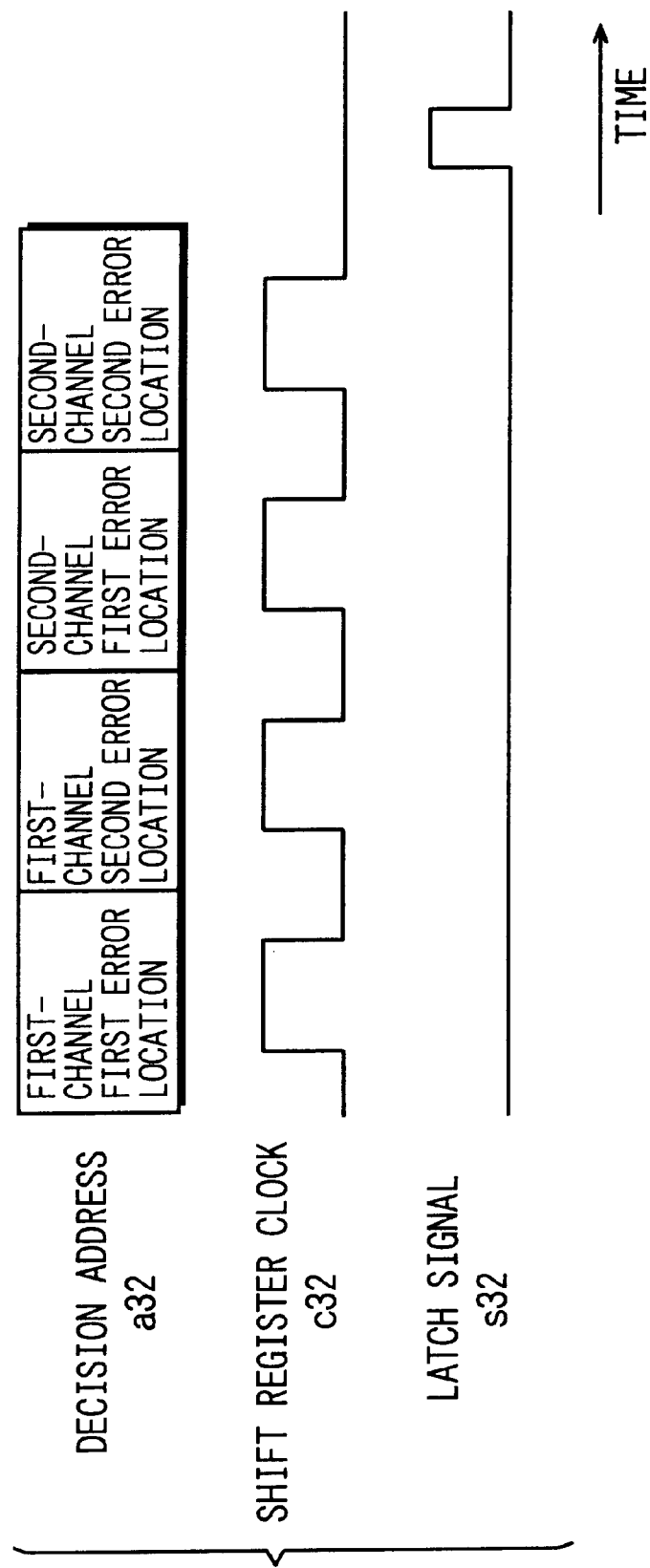
FIG. 5 is a timing chart showing operation made by the decision address generator shown in FIG. 3 in the first embodiment.

FIG. 3 is a block diagram showing a structure of the data comparator 3 shown in FIG. 1. As shown in FIG. 3, the data comparator 3 has data memory portions 31a and 31b, a decision address generator 32, an exclusive OR operation portion 33, a shift register 34, AND operation portions 35a and 35b, and latches 36a and 36b. FIG. 4 is a diagram showing the contents of the data memory portions shown in FIG. 3. The contents of the data are represented, from the leading bit in a block of demodulated data, as 0th bit, first bit, . . . , (n−1)th bit. FIG. 5 is a timing chart showing operation of the decision address generator 32 shown in FIG. 3. The data memory portions 31a and 31b shown in FIG. 3 store one block of data in the demodulated data d1a and d1b, respectively, as shown in FIG. 4. The decision address generator 32 receives the first-channel error locations e2a and the second-channel error locations e2b and arrange the first-channel first error location, first-channel second error location, second-channel first error location, and second-channel second error location in a time series manner as shown in FIG. 5, and outputs them to the data memory portions 31a and 31b as decision address a32 for data reading. It also outputs a clock c32 for instructing the shift register 34 to read outputs corresponding to the respective error locations sent from the exclusive OR operation portion 33, and also outputs a latch signal s32 to the latches 36a and 36b. The exclusive OR operation portion 33 calculates exclusive OR of the outputs from the data memory portions 31a and 31b (corresponding to comparison between the data of two channels). As the result, when the data in the two channels are equal, it provides a comparison result at 0, and when the data are different, it provides a comparison result at 1, to the shift register. The shift register 34 captures the outputs from the exclusive OR operation portion 33 while shifting according to the rise of the clock c32 to store the results of exclusive OR corresponding to the first-channel first error location, first-channel second error location, second-channel first error location, and second-channel second error location. The AND operation portion 35a calculates AND of the comparison results corresponding to the first-channel first error location and the first-channel second error location stored in the shift register 34. As the result, when the data in the two channels corresponding to the first-channel error locations both differ, it outputs an operation result at 1, and otherwise it outputs an operation result at 0. The AND operation portion 35b ANDs the comparison results corresponding to the second-channel first error location and the second-channel second error location stored in the shift register 34. As the result, when the data in the two channels corresponding to the second-channel error locations both differ, it outputs an operation result at 1, and otherwise it outputs an operation result at 0. The latches 36a and 36b respectively capture, hold, and output the outputs from the AND operation portions 35a and 35b in accordance with the timing of the latch signal s32 from the decision address generator 32. Accordingly, the data comparator in FIG. 3 outputs "1" as the first-channel decision signal s1a when data in the two channels corresponding to the first-channel error locations differ in both locations, and outputs "1" as the second-channel decision signal s1b when data in the two channels corresponding to the second-channel error locations differ in both locations.

When the number of errors is less than two, the data comparator 3 operates as shown below. First, the data memory portions 31a and 31b contain dummy data previously stored in region specified by dummy address, other than the region for storing received data, where the dummy data for the two channels are set to different values. Specifically, for example, the dummy address is set as n, the first-channel dummy data as "0," and the second-channel dummy data as "1." When the number of errors is one, the decision address generator 32 outputs the dummy address in place of the second error location, and when the number of errors is zero, it outputs the dummy address in place of the first error location and the second error location. As the result, when the number of errors is one, the exclusive OR corresponding to the second error location is always "1," which is provided to the AND operation portion as one of its inputs. Then the result of comparison about the data in the first error location is intactly provided as the output from the AND operation portion. That is to say, when the number of errors is one, the data comparator 3 generates the decision signal on the basis of the data in the first error location only. When the number of errors is zero, all outputs from the exclusive OR are at "1," and hence the two inputs to the AND operation portion are both at "1," and therefore the output from the AND operation portion is always at "1." That is to say, when the number of errors is zero, the data comparator 3 always generates "1" as the decision signal.

When a code capable of error correction of 3 or more bits is used as the error correcting code, a similar structure can be applied by increasing the number of stages of the shift register 34 and providing inputs of 3 or more bits to the AND operation portions 35a and 35b.

Figure 6:
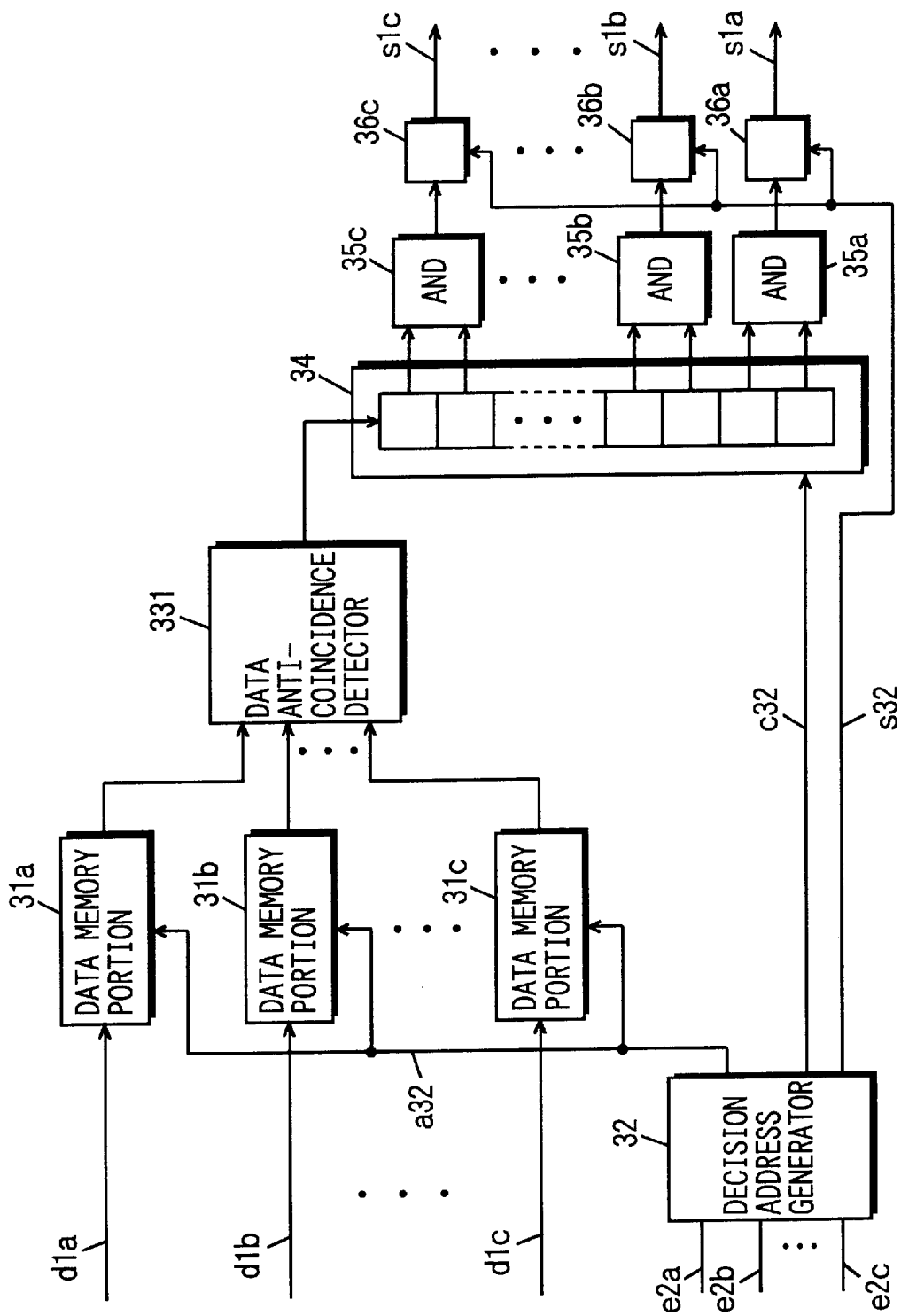
FIG. 6 is a block diagram showing a structure of the data comparator which is used when three or more channels of demodulated data are used in the first embodiment.

While FIG. 3 shows a structure for use with two channels of demodulated data, a data comparator having the structure shown in FIG. 6, for example may be used in place of the data comparator shown in FIG. 3. The data comparator can thus be easily expanded so that the selection can be made from three or more channels of inputs. The data comparator shown in FIG. 6 uses a data anticoincidence detector 331 in place of the exclusive OR operation portion 33 in the data comparator shown in FIG. 3. The other parts operate in the same way as those in FIG. 3. The data anticoincidence detector 331 outputs "0" when all inputs are equal, and outputs "1" when at least one of them differs. This is due to the fact that when all inputs are equal, the possibility that the bit is wrong is very small, and it is then expected that the estimated error location is incorrect. The data anticoincidence detector 331 may be structured to output "1" only when the value of the bit in the error location in the demodulated data of the target channel differs from values of the bits in the corresponding location in all other channels.

Figure 7:
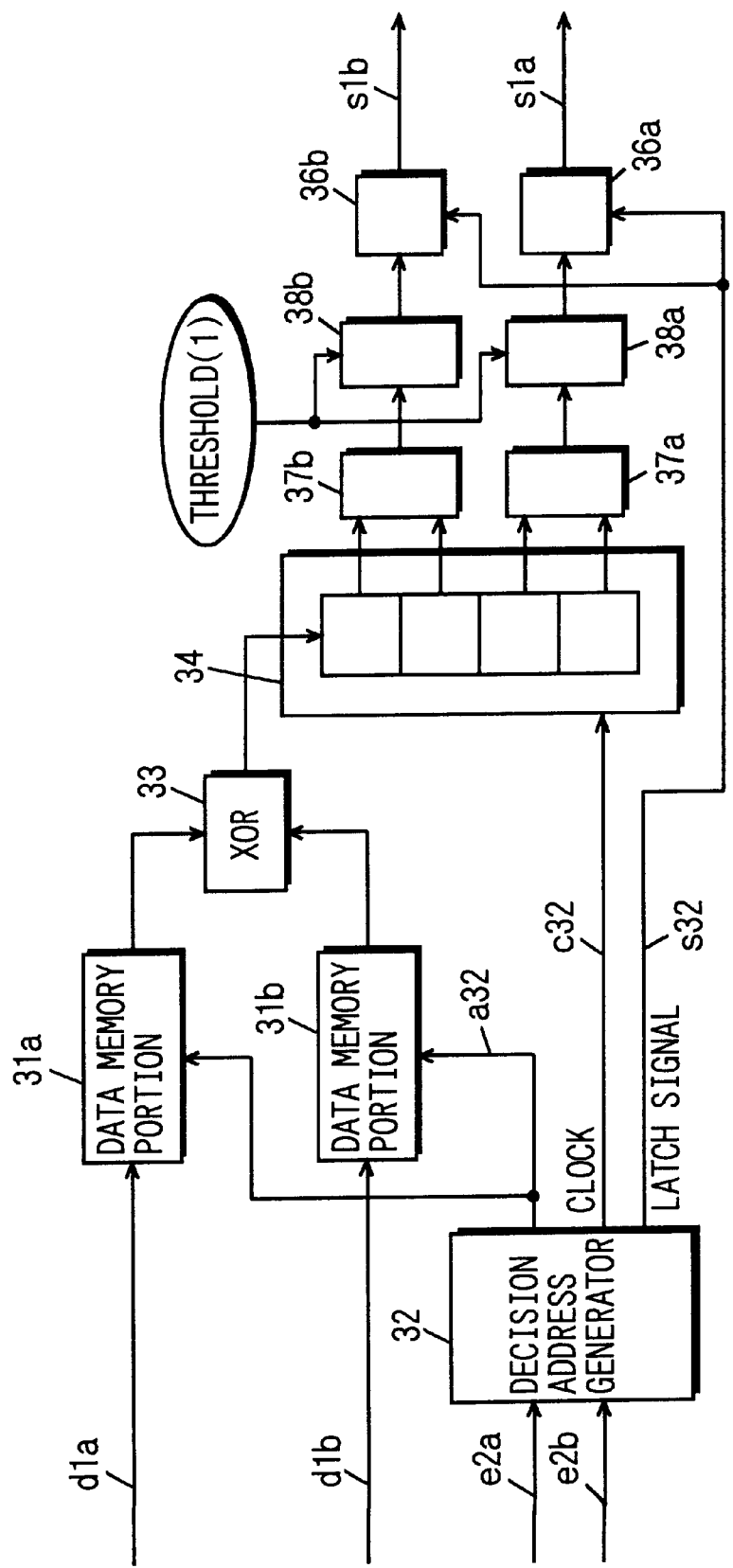
FIG. 7 is a block diagram showing another structure of the data comparator in the first embodiment.

Although the data comparator in FIG. 3 outputs "1" as the decision signals when the data in the two channels corresponding to the error locations differ in both of the two locations, the data comparator may be structured as shown in FIG. 7 so that the decision signals are outputted when the data differ in at least one of the two locations. The data comparator in FIG. 7 has counting portions 37a and 37b and comparators 38a and 38b, in place of the logic operation portions 35a and 35b. The counting portions 37a and 37b count the numbers of different bits in the data in the two channels corresponding to the error locations. The comparators 38a and 38b compare the results counted by the counting portions 37a and 37b with a predetermined threshold ("1" in this case) and output "1" when they are equal to or larger than the threshold, and output "0" in other cases. The other structural elements and operation are the same as those described referring to FIG. 3. When a 3-bit error correctable code is used as the error correcting code, an arbitrary number which is equal to or larger than 1 and smaller than the number of correctable bits can be used as the threshold, and the criterion for decision can thus be flexibly set.

Figure 8:
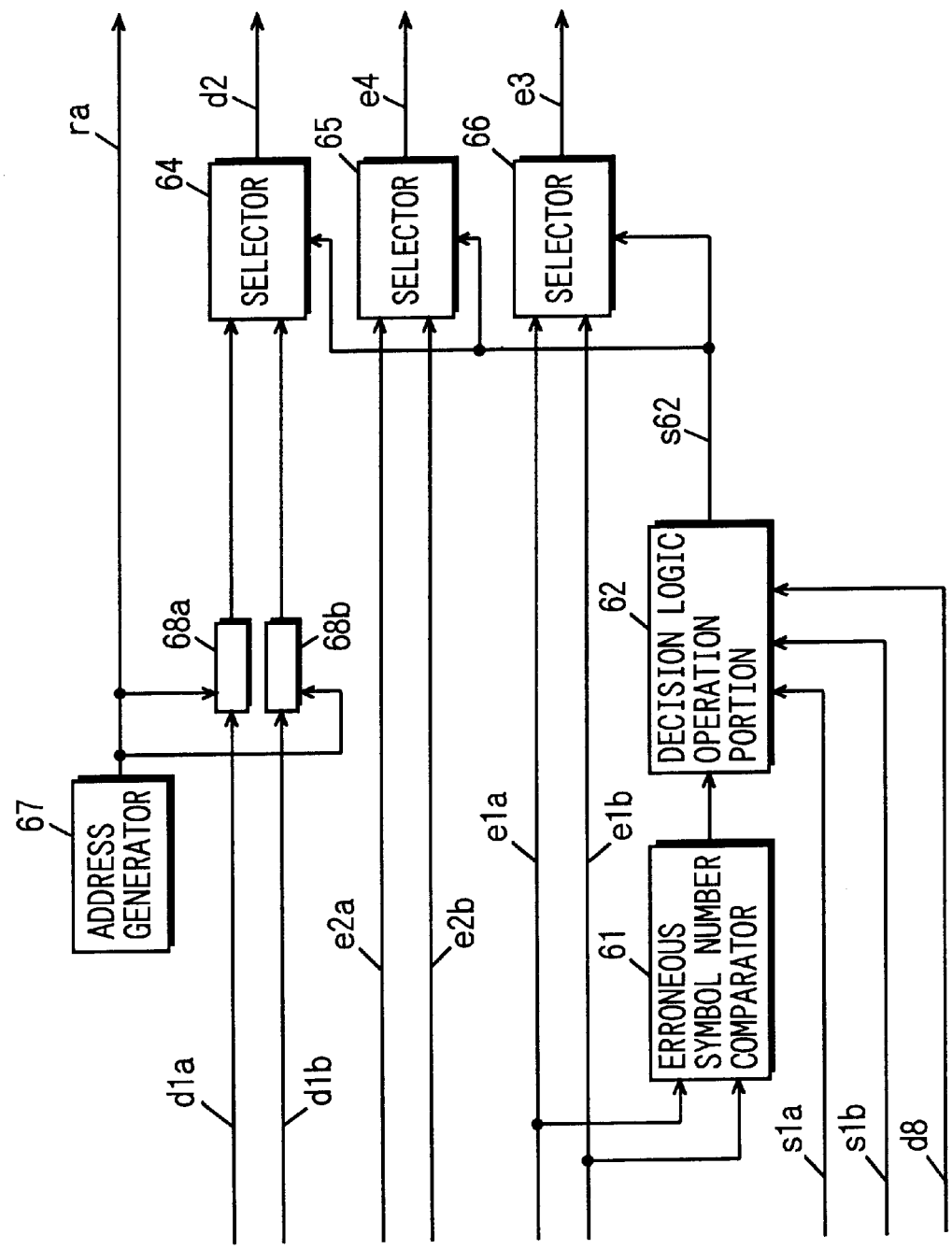
FIG. 8 is a block diagram showing the structure of the data selector in the first embodiment.

FIG. 8 is a block diagram showing the structure of the data selector 4 shown in FIG. 1. As shown in FIG. 8, the data selector 4 has an erroneous symbol number comparator 61, a decision logic operation portion 62, selectors 64, 65, and 66, an address generator 67, and data memory portions 68a and 68b. The erroneous symbol number comparator 61 compares the erroneous symbol numbers e1a and e1b to determine which is larger, or whether they are equal, and outputs a signal showing the result of the decision as a comparison result "re" about the numbers of erroneous symbols. The decision logic operation portion 62 receives the result of the decision, re, from the erroneous symbol number comparator 61, the decision signals s1a and s1b, and the detection result d8 from the data detector 8, and decides which of the channels should be selected and generates a selection signal s62. The selectors 64, 65, and 66 respectively select one of the data read from the data memory portions, one of the input error locations, and one of the erroneous symbol numbers, in accordance with the selection signal s62 from the decision logic operation portion 62, and output them as the selected data d2, the selected error location e4, and the selected erroneous symbol number e3, respectively. The data memory portions 68a and 68b respectively store one block of data in the demodulated data d1a and d1b and read the data according to addresses from the address generator 67. The address generator 67 sequentially generates the address ra from 0 to (n–1) for one block of data, which are provided to the data memory portions 68a and 68b and also to the outside.

Figure 9:
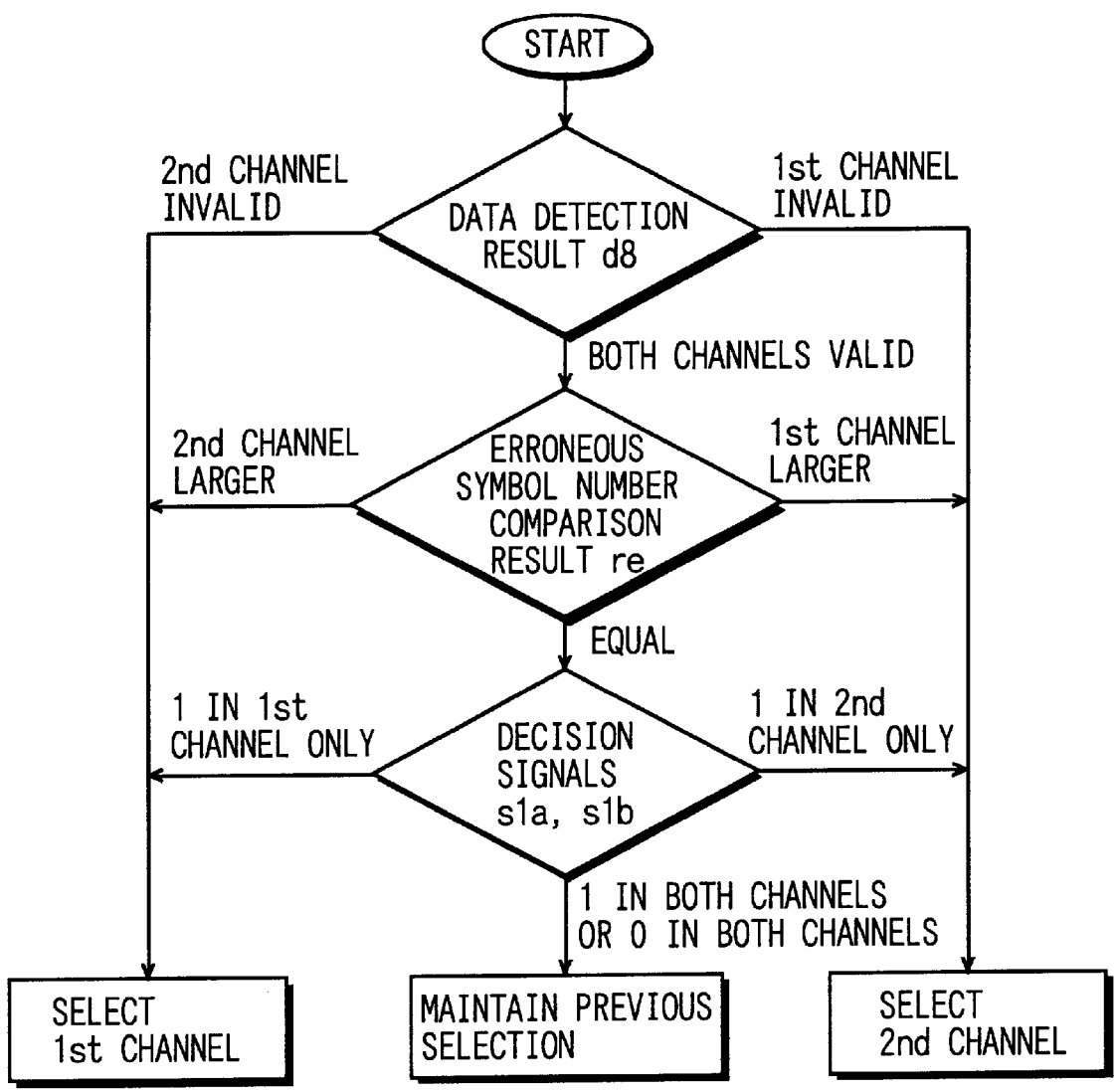
FIG. 9 is a flowchart showing an example of the decision procedure of the decision logic operation portion in the diversity reception apparatus of the first embodiment.

FIG. 9 is a flowchart showing an example of the decision procedure made by the decision logic operation portion 62 shown in FIG. 8. When the detection result d8 from the data detector 8 indicates that one of the channels is invalid, the valid channel is selected independently of the comparison result re about the erroneous symbol numbers and the decision signals s1a and s1b. When the detection result d8 from the data detector indicates that both channels are valid, a decision is made first on the basis of the comparison result re from the erroneous symbol number comparator 61. That is to say, when the numbers of erroneous symbols differ, a channel with a less number of erroneous symbols is selected. When the erroneous symbol numbers are equal, one of the channels of which decision signal is at "1" is selected on the basis of the decision signals s1a (the decision signal for the first channel) and s1b (the decision signal for the second channel). When the decision signals for the two channels are both at "1" or both at "0," it is impossible to decide which is better. Then one of the channels which was selected in the previous block is maintained. The decision logic operation portion 62 makes this decision for each block of the BCH code and updates the output.

Figure 10:
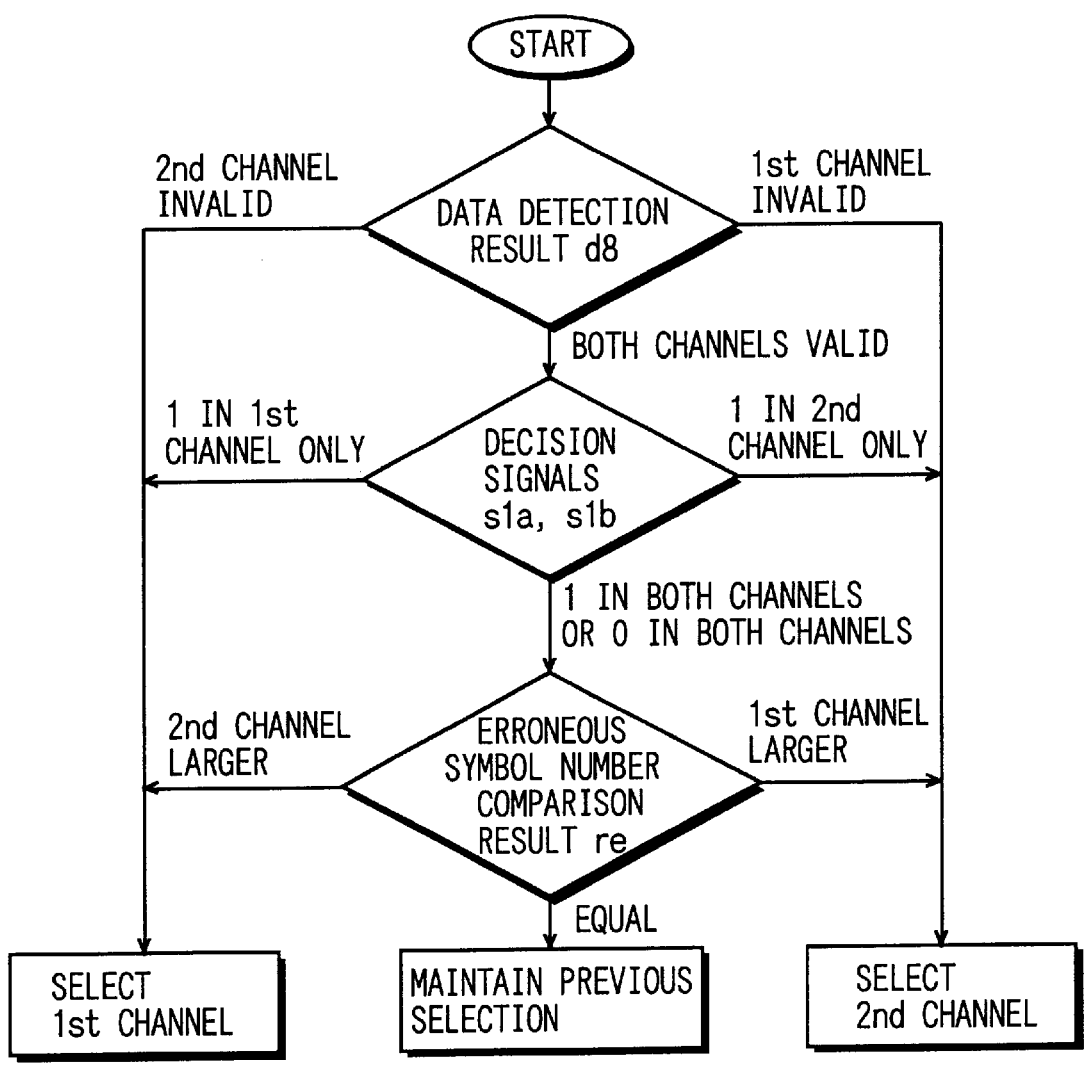
FIG. 10 is a flowchart showing another example of the decision procedure of the decision logic operation portion in the diversity reception apparatus of the first embodiment.

FIG. 10 is a flowchart showing another example of the decision procedure of the decision logic operation portion 62. In this decision procedure, when the detection result d8 from the data detector 8 indicates that one of the channels is invalid, the valid channel is selected independently of the comparison result re about the numbers of erroneous symbols and the decision signals s1a and s1b, similarly to the decision procedure shown in FIG. 9. However, unlike the decision procedure shown in FIG. 9, when the detection result d8 from the data detector indicates the state in which both channels are valid, the decision signals s1a (the first-channel decision signal) and s1b (the second-channel decision signal) are checked first and one of the channels of which decision signal is at "1" is selected. When the decision signals for the two channels are both at "1" or both at "0," the decision is made on the basis of the comparison result re from the erroneous symbol number comparator 61. That is to say, a channel with a smaller number of erroneous symbols is selected when the numbers of erroneous symbols differ. When the numbers of erroneous symbols are equal, it is impossible to decide which channel is superior, so the channel selected in the previous block is maintained. The decision logic operation portion 62 makes the decision for each block of BCH code and updates the output.

Figure 11:
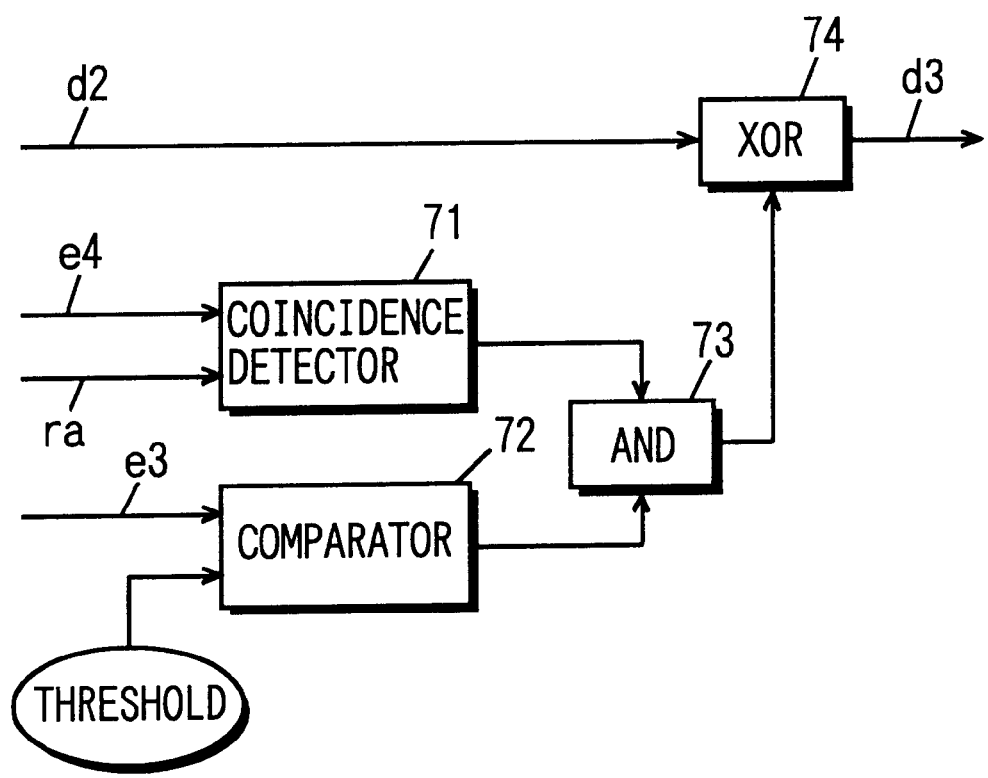
FIG. 11 is a block diagram showing the structure of the bit inverter in the first embodiment.

FIG. 11 is a block diagram showing the structure of the bit inverter 5 shown in FIG. 1. As shown in FIG. 11, the bit inverter 5 has a coincidence detector 71, a comparator 72, an AND operation portion 73, and an exclusive OR operation portion 74. The coincidence detector 71 outputs "1" only at an instant the input selected error location e4 coincides with the address ra. The comparator 72 compares the selected erroneous symbol number e3 with a given threshold and outputs "1" only when the selected erroneous symbol number e3 does not exceed the threshold. The exclusive OR operation portion 74 inverts the bit in the selected data d2 only when the output from the coincidence detector 71 and the output from the comparator 72 are both at "1." Accordingly when the selected erroneous symbol number does not exceed the given threshold, the bit inverter 5 inverts the bit corresponding to the selected error location in the selected data, so as to correct the error. For the 2-bit error correcting BCH code, an error of 3 or more bits cannot be corrected. Therefore it is adequate to set the given threshold to 2.

Although the above-described data comparator 3 and data selector 4 have their respective data memory portions, a single memory can be shared for their functions. This enables reduction in memory capacity.

The above-described structure realizes a diversity reception apparatus which performs highly reliable selection for each block on the basis of the number of erroneous symbols and reliability of error locations in demodulated data, and also performs error correction at the same time.

In the description above, the input modulated signal is a chirp PSK signal and the demodulator is a subband demodulator having subband filters and differential detectors for two channels. However, the present invention can be applied to other applications, i.e., generally to diversity reception using a plurality of demodulated data. For example, as shown in the second embodiment of the present invention described below, the invention can be applied to a structure in which a plurality of demodulated data are obtained from a plurality of modulated signals obtained through reception at a plurality of antennas.

(Second Embodiment)

Figure 12:
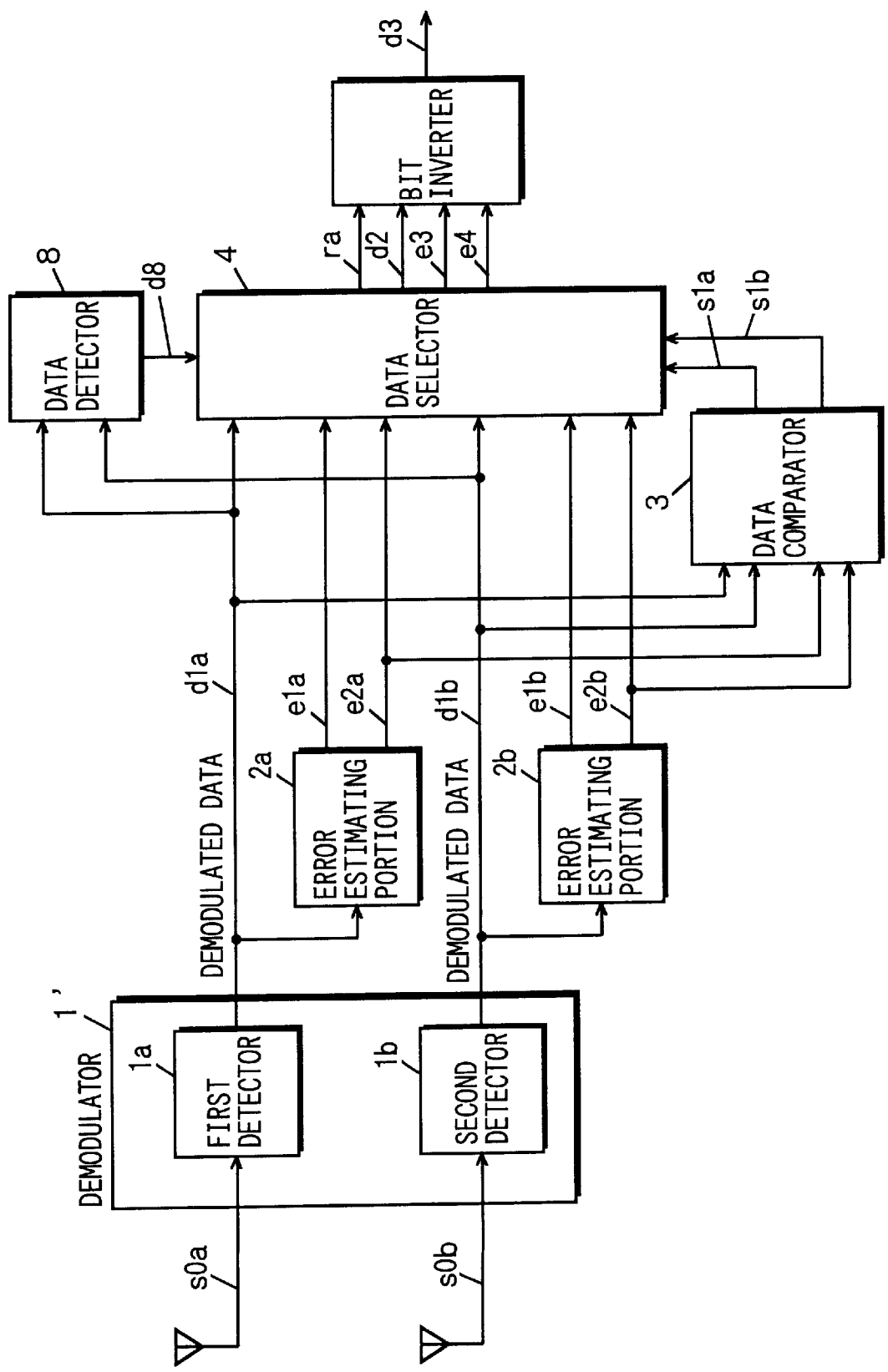
FIG. 12 is a block diagram showing the structure of a diversity reception apparatus according to a second embodiment of the present invention.

FIG. 12 is a block diagram showing a diversity reception apparatus according to a second embodiment of the present invention. As shown in FIG. 12, this diversity reception apparatus differs from the diversity reception apparatus of the first embodiment shown in FIG. 1 in that it has a demodulator 1' including a first detector 1a and a second detector 1b. Other structural elements are the same as those in the first embodiment shown in FIG. 1. The demodulator 1' obtains two channels of demodulated data d1a and d1b from two channels of modulated signals obtained by receiving radio waves at two channel of antennas. The operation is the same as that of the diversity reception apparatus shown in FIG. 1 in other respects, and therefore it is not described again.

(Third Embodiment)

Figure 13:
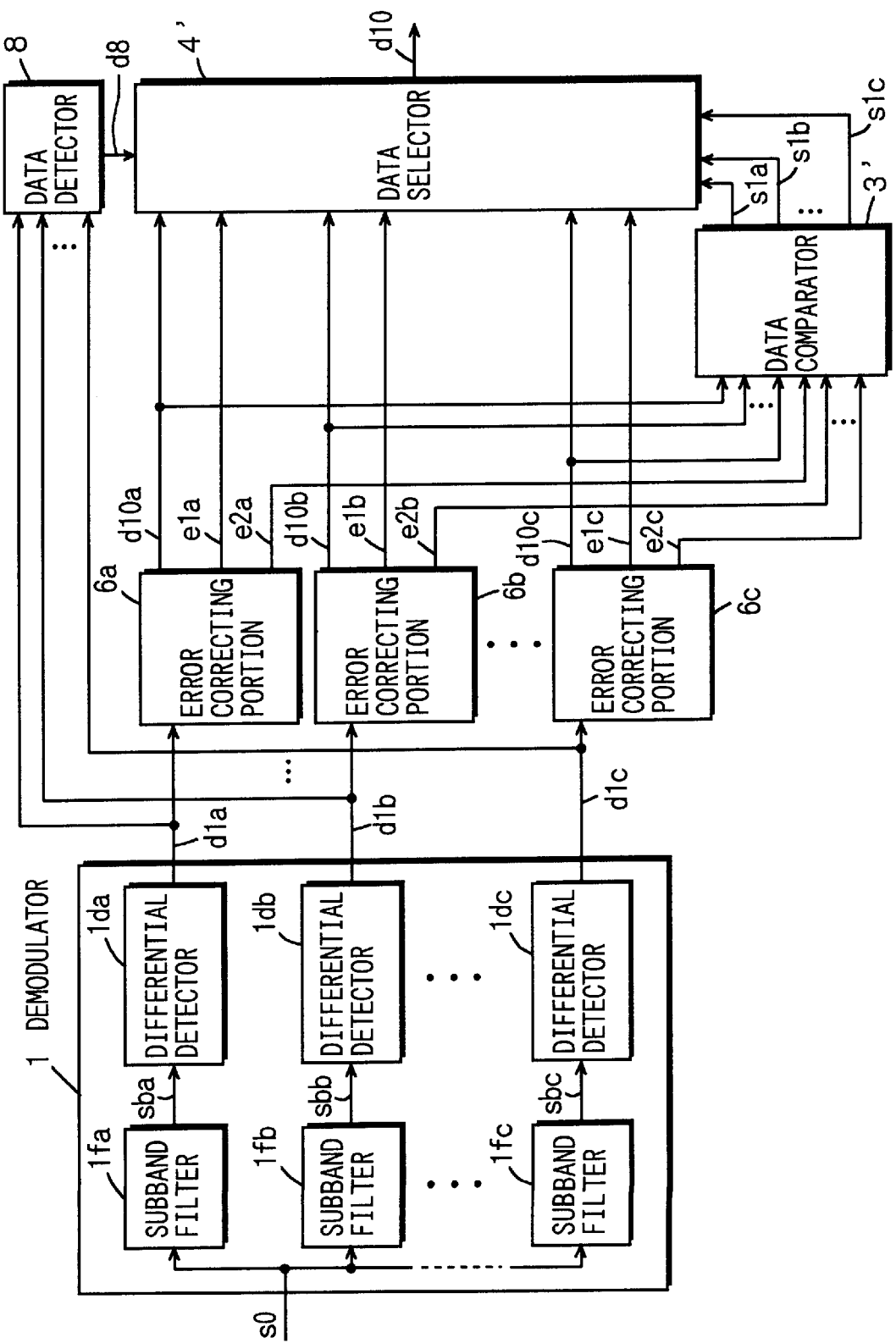
FIG. 13 is a block diagram showing the structure of a diversity reception apparatus according to a third embodiment of the present invention.

FIG. 13 is a block diagram showing a diversity reception apparatus according to a third embodiment of the present invention. As shown in FIG. 13, this diversity reception apparatus has error correcting portions 6a, 6b, . . . , 6c in place of the error estimating portions 2a, 2b, . . . , 2c, a data comparator 3' in place of the data comparator 3, and a data selector 4' in place of the data selector 4. The other structural elements and operation are the same as those in the first embodiment shown in FIG. 1. Similarly to the error estimating portions 2a, 2b, . . . , 2c shown in FIG. 1, the error correcting portions 6a, 6b, . . . , 6c estimate the numbers of erroneous symbols and the error locations from the demodulated data d1a, d1b, . . . , d1c. Further, when the number of errors is estimated to be 2 or less, they correct the erroneous bits in the demodulated data and output decoded data d10a, d10b, . . . , d10c. When the number of errors is estimated to be 3 or more, they output the intact demodulated data d1a, d1b, . . . ; d1c as the decoded data d10a, d10b, . . . , d10c without correcting. These error correcting portions can be realized with the same structure as the BCH error correcting device shown in U.S. Pat. No. 5,216,676, which is incorporated herein by reference, for example. The data comparator 3' has the same function as the data comparator 3 shown in FIG. 1. The data selector 4 selects one of the decoded data d10a, d10b, . . . , d10c on the basis of the erroneous symbol numbers e1a, e1b, . . . e1c and the decision signals s1a, s1b, . . . , s1c and outputs it as final decoded data d10.

Figure 14:
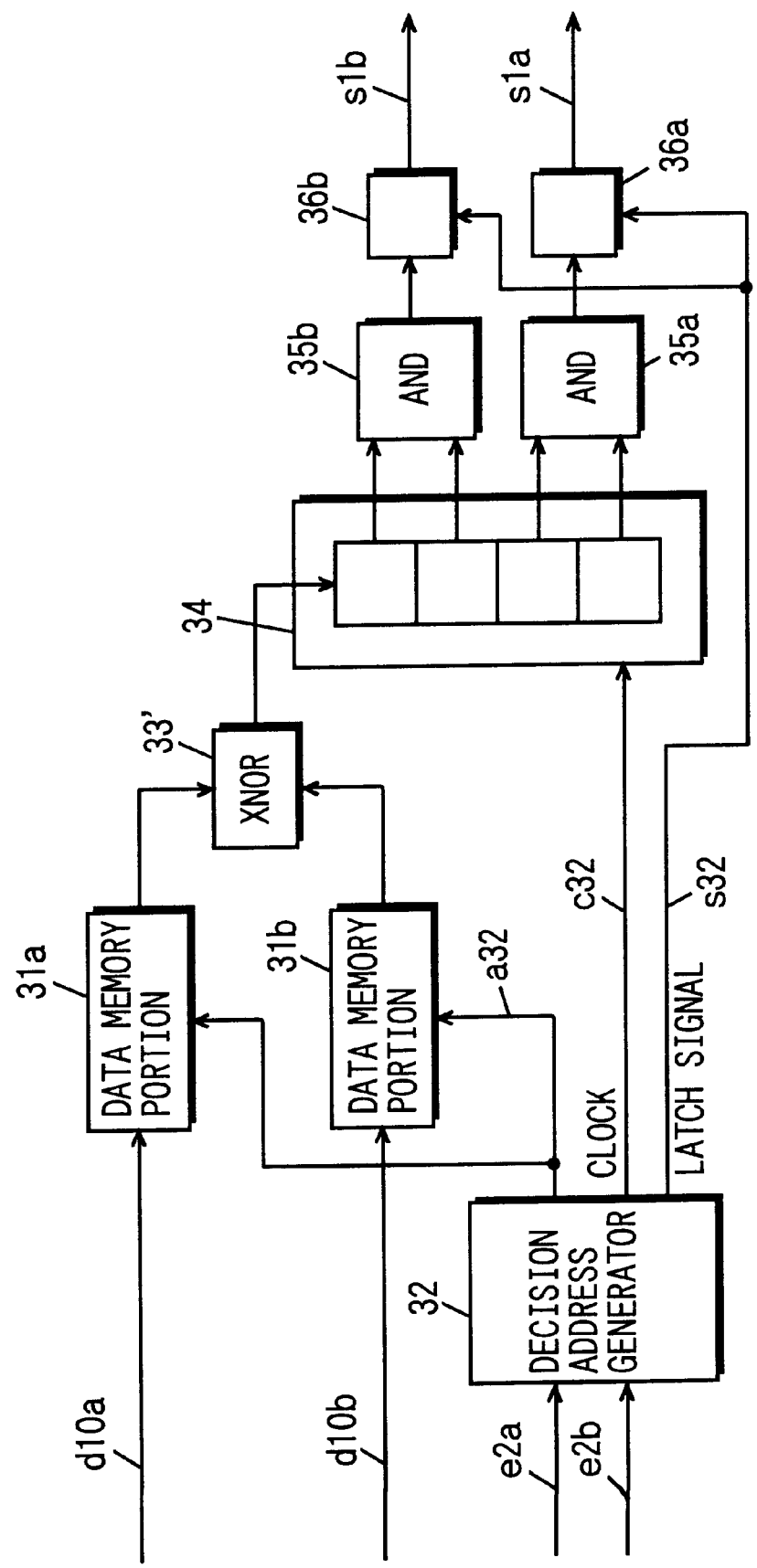
FIG. 14 is a block diagram showing a structure of the data comparator in the third embodiment.

FIG. 14 is a block diagram showing the structure of the data comparator 3' shown in FIG. 13 in the case in which two channels of demodulated data are used. While it has almost the same structure as the data comparator shown in FIG. 3, an exclusive NOR operation portion 33' is used in place of the exclusive OR operation portion 33, since the decoded data d10a and d10b are inputted in place of the demodulated data d1a and d1b. That is to say, the shift register 34 receives a comparison result at 1 when bits in error location in the two channels are equal, and at 0 when they are different. The other structural elements and operation are the same as those of the data comparator shown in FIG. 3.

Figure 15:
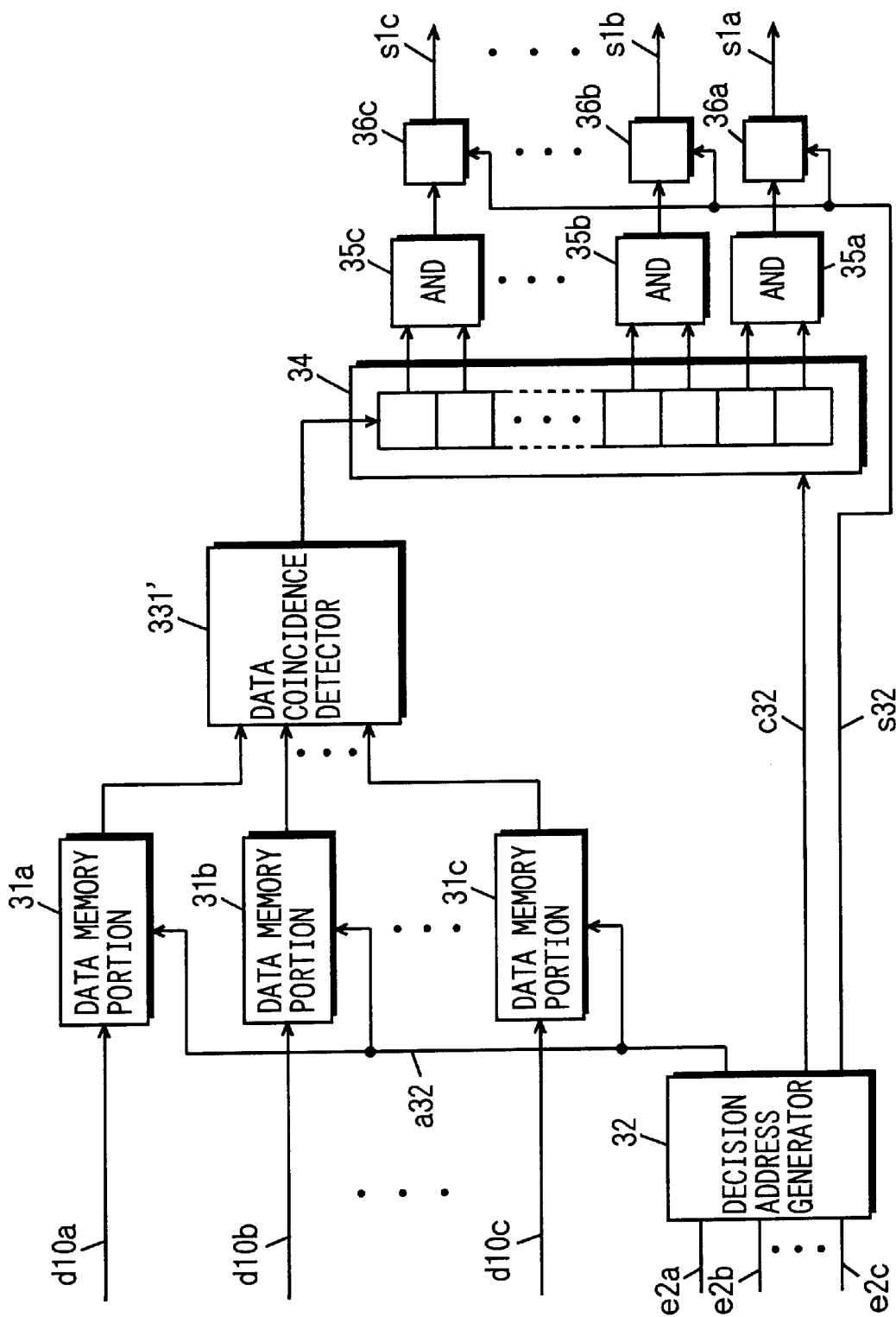
FIG. 15 is a block diagram showing the structure of the data comparator which is used when three or more channels of demodulated data are used in the third embodiment.

It is possible to easily expand the structure so that it can make the selection from three or more channels of inputs by using a data comparator having the structure shown in FIG. 15, for example, in place of the data comparator shown in FIG. 14. The data comparator of FIG. 15 includes a data coincidence detector 331' in place of the data anticoincidence detector 331 in the data comparator of FIG. 6. The other parts operate in the same way as those in the data comparator of FIG. 6. The data coincidence detector 331' outputs "1" when all inputs are equal and outputs "0" when even only one differs. This is due to the fact that it is expected that the results of error correction are correct when all inputs are equal. The data coincidence detector 331' may be constructed to output "0" only when the value of the bit in the error location in the decoded data of the target channel differs from values of the bits in the corresponding location in all other channels.

Figure 16:
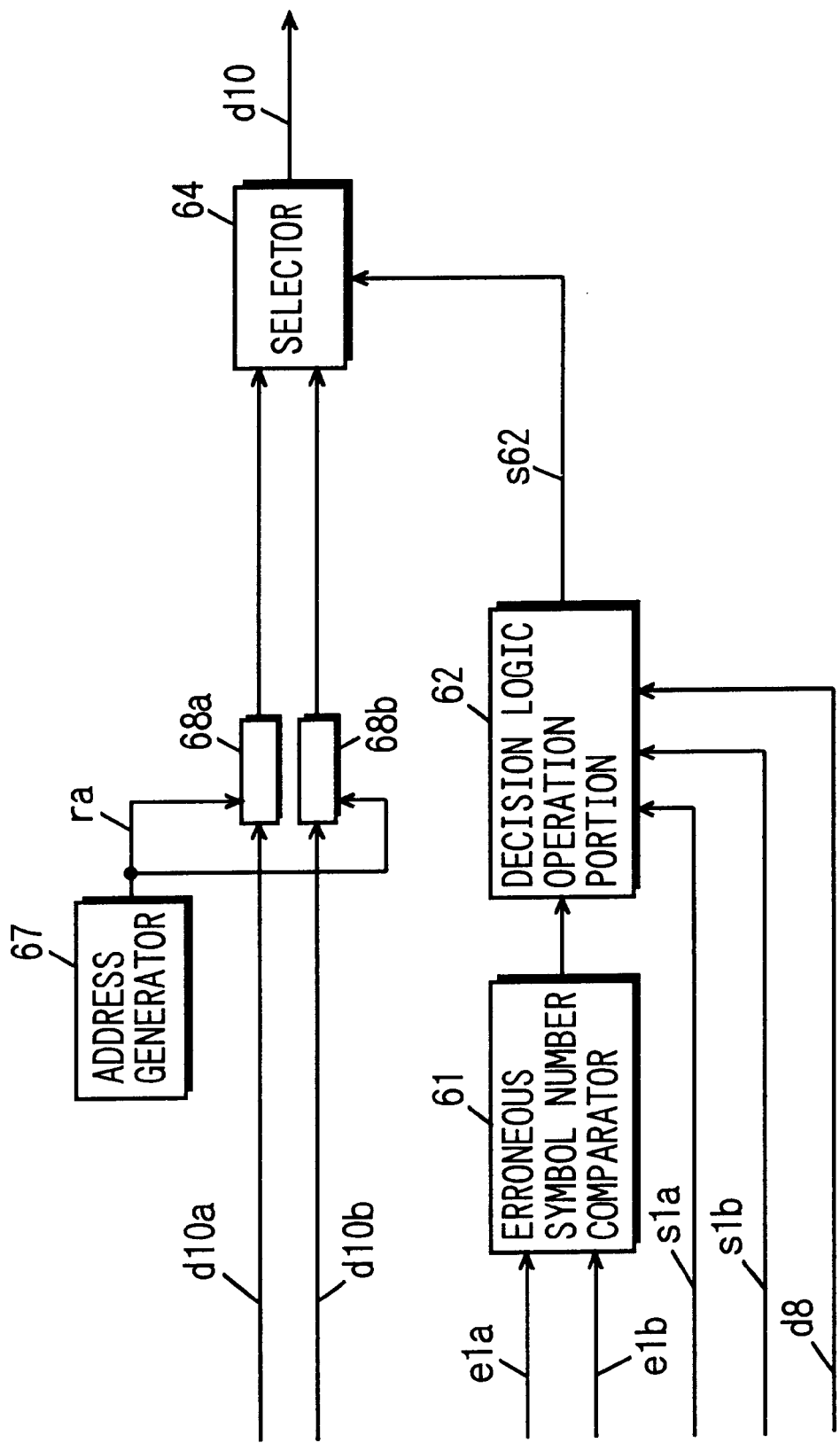
FIG. 16 is a block diagram showing the structure of the data selector in the third embodiment.
Figure 17:
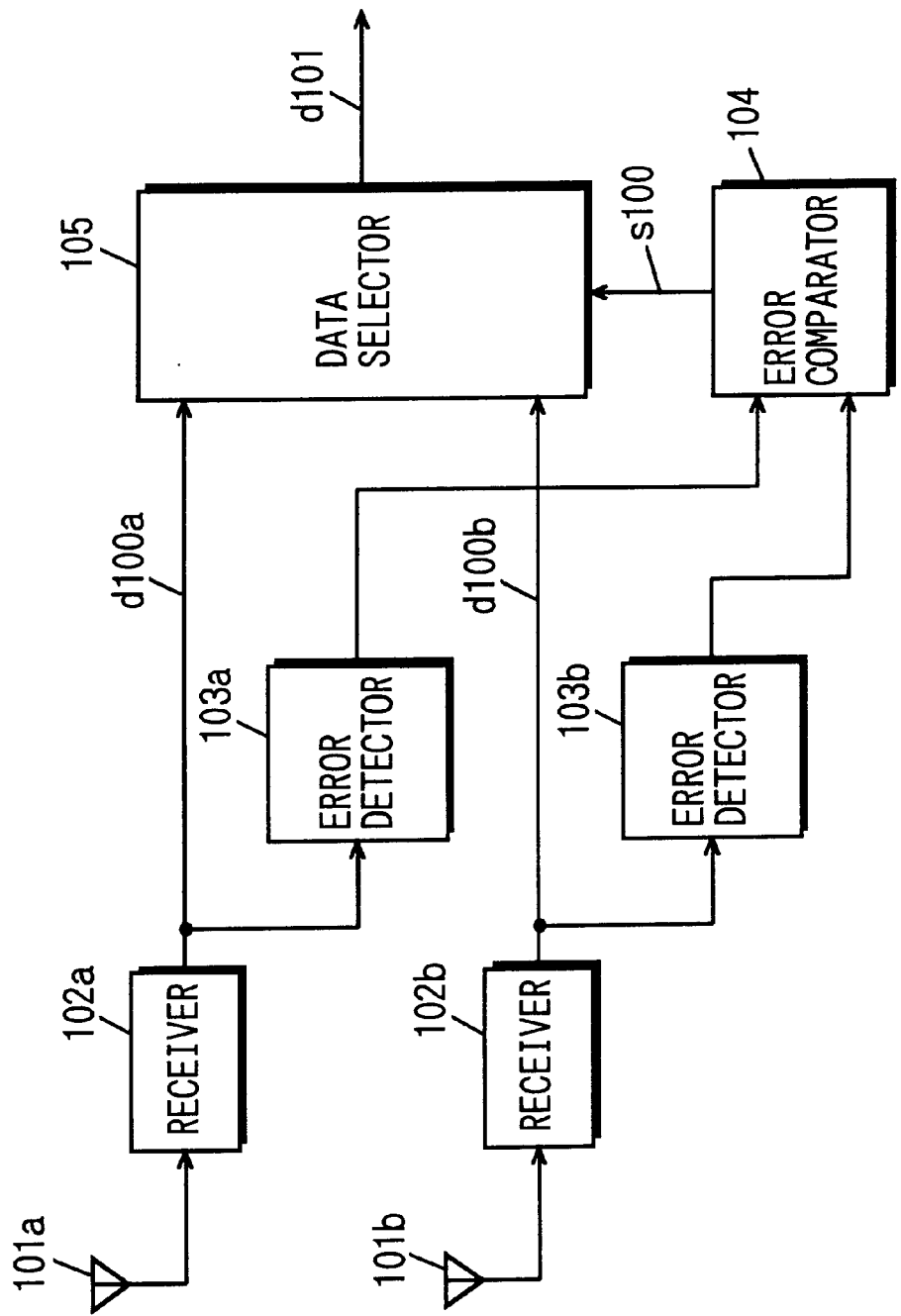
FIG. 17 is a block diagram showing the structure of a conventional diversity reception apparatus.

FIG. 16 is a block diagram showing the structure of the data selector 4' shown in FIG. 13. Although it has almost the same structure as the data selector shown in FIG. 8, it differs in that the decoded data d10a and d10b are inputted in place of the demodulated data d1a and d1b and that the decoded data d10 is outputted in place of the selected data d2. Its operation is similar to that of the data selector shown in FIG. 8. The data selector 4' does not output the selected erroneous symbol number e3, selected error location e4, and address ra, nor receive the error locations e2a and e2b. Hence the data selector 4' does not have the selectors 65 and 66 shown in FIG. 8.

(Characteristic Evaluation in Error-Correcting and Combining)

As has been described above, diversity combining using an error correcting code is performed in the embodiments of the invention. According to the diversity combining, accuracy of error estimation is checked on the basis of comparison with other channels, so that the reliability of the error estimation can be maintained even when a less redundant and short code is used. It is also possible to select a channel of good quality even when all channels of demodulated data have the same extent of errors. For such diversity combining using an error correcting code (hereinafter referred to as "error-correcting and combining"), characteristic evaluation in the diversity combining according to the first embodiment is shown by the inventors of the present invention in "A Consideration of 'Error-Correcting and Combining' Method in SR-chirp Scheme," Technical Report of IEICE (the Institute of Electronics, Information and Communication Engineers), CS98-33, May 1998. Now, on the basis of the contents of the technical report, characteristic evaluation in the error-correcting and combining of the first embodiment will be described. In the first embodiment, the present invention is applied to a diversity reception apparatus based on a modulating/demodulating scheme called "SR-chirp PSK scheme." The "SR-chirp PSK scheme" is a modulating/demodulating scheme in which a chirp PSK signal obtained by multiplying a differential-PSK-modulated primary modulated signal by a chirp signal is transmitted and part of the band, subband, is extracted on the receiving side and demodulated by differential detection.

In the characteristic evaluation, a single-bit correcting code of binary BCH code (hereinafter referred to as BCH SEC code or simply as SEC code) and a double-bit correcting code of binary BCH code (hereinafter referred to as BCH DEC code, or simply as DEC code) are used as the error correcting code. In the description below, when one block is n-bit long and the information data is k-bit long as shown in FIG. 2, the BCH SEC and BCH DEC are preceded by the numbers (n, k).

Figure 18:
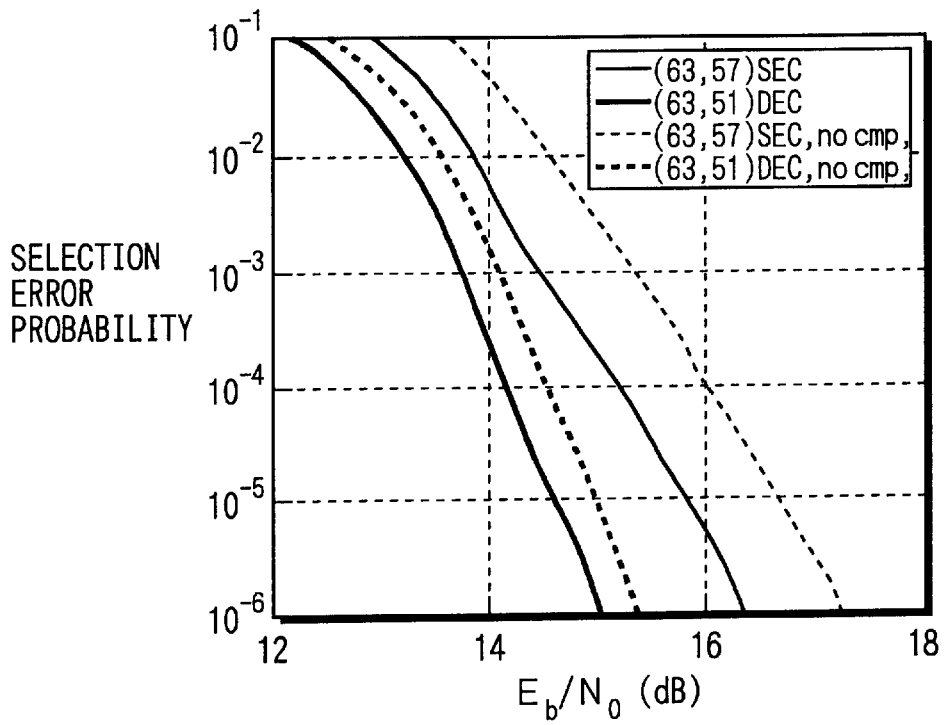
FIG. 18 is a diagram showing results obtained by computer simulation about the selection error probability in the diversity reception apparatus of the first embodiment.

In error-correcting and combining, when the error rate on the transmission path is large to a certain extent, erroneous estimation may occur, and then a channel with a larger number of errors may be selected (hereinafter selecting a channel with more errors is referred to as selection error). FIG. 18 shows results obtained by computer simulations about the selection error probability in the first embodiment when (63, 57) BCH SEC code and (63, 51) BCH DEC code were used. In FIG. 18, the abscissa shows the ratio of signal energy per one bit of information data to the noise power density, Eb/No, and the ordinate shows the selection error probability. The characteristic evaluation used the following modulation/demodulation parameters:

(a) The modulation/demodulation scheme is SR-chirp QPSK.

(b) The number of reception subbands is two channels.

(c) The reception subband frequency is $f_0 \pm 1.75$ MHz.

(d) For subband width, BT=2.4.

(e) Spreading rate is 10.8.

The transmission path is a static environment AWGN channel without multipath (hereinafter referred to as static AWGN). In FIG. 18, the solid lines show characteristics in the case of error-correcting and combining, i.e , characteristics in the case where the error estimation accuracy is determined on the basis of comparison with other channels, and the dotted lines show characteristics in the case where the selection is made only on the basis of comparison among the estimated numbers of erroneous bits, without making comparison with other channels. In FIG. 18, the thin lines show characteristics in the case where the SEC code is used, and the thick lines show characteristics in the case where the DEC code is used.

It is seen from FIG. 18 that, generally, the selection error probability is larger when the SEC code is used than when the DEC code is used. Comparing the solid lines and the dotted lines in FIG. 18 shows that determining the accuracy by comparison with other channels contributes to reduction of the selection errors. In the case of the SEC code, the selection errors are reduced by 10 times or more, and in the case of the DEC code, they are reduced by almost 10 times.

Figure 19:
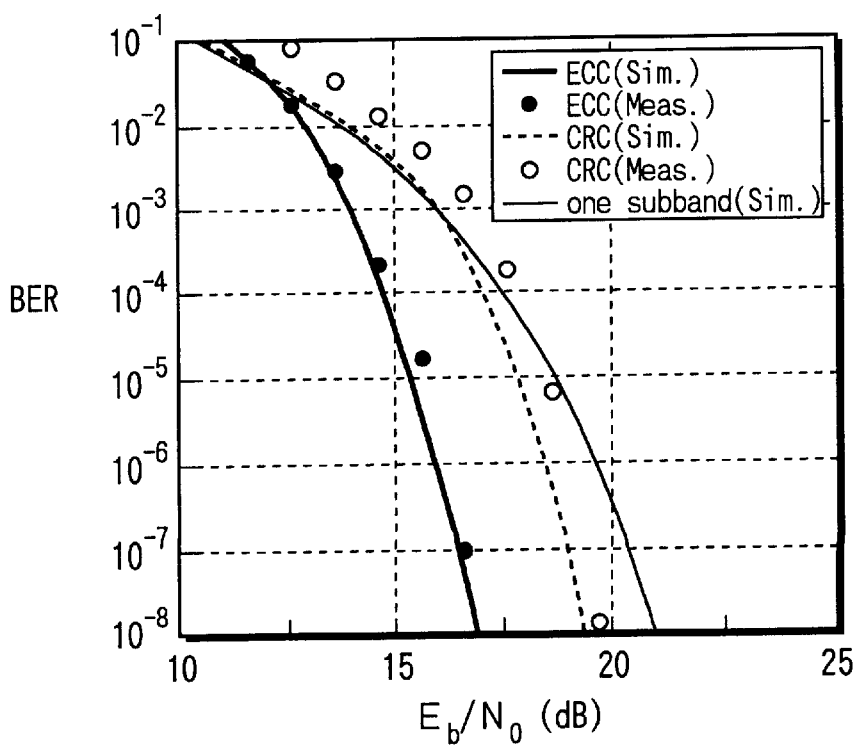
FIG. 19 is a diagram showing results obtained by computer simulation and actual measurements about the bit error rate characteristic in error-correcting and combining in the first embodiment and CRC selecting and combining under static environment without multipath.

FIG. 19 shows the bit error rate characteristic (hereinafter referred to as BER characteristic) in the error-correcting and combining and the CRC selecting and combining under static environment without multipath. In the CRC selecting and combining (shown as CRC in FIG. 19), data is framed by using CRC error detecting code with unique word, information data, and CRC (Cyclic Redundancy Check code) arranged in order, and data in a channel with no error are selected and combined frame by frame. In the error-correcting and combining (shown as ECC in FIG. 19), (63, 51) BCH DEC code was used. For a reference, the diagram shows characteristic of one subband (no correcting/combining), too. In FIG. 19, the solid line and the dotted line show results of computer simulation, and the points show actual measurements with an artificial transmission path and prototype modem.

It is seen from FIG. 19 that the required Eb/No is improved by about 2 to 3 dB in the error-correcting and combining, as compared with the CRC selecting and combining. In the CRC selecting and combining, no improvement is seen as compared with that with one subband in the region with larger bit error rate (BER, $10^{-3}$ or higher). This is due to the fact that frames in both channels suffer errors at the same time and the selection cannot be made appropriately. In contrast, in the error-correcting and combining, it is improved also in the region with relatively large error rate in which the bit error rate (BER) is about $10^{-3}$ to $10^{-2}$.

While the invention has been described in detail, the foregoing description is in all aspects illustrative and not restrictive. It is understood that numerous other modifications and variations can be devised without departing from the scope of the invention.

What is claimed is:

1. A diversity reception apparatus receiving one or a plurality of modulated signals modulated with error-correctably coded data, comprising:

demodulating means for demodulating said modulated signal(s) to obtain demodulated data in a plurality of channels corresponding to said coded data;

error estimating means for estimating the number of erroneous symbols and error locations thereof in the demodulated data in each channel;

data comparing means for comparing the data in said error locations estimated in the demodulated data in each channel with the data in the corresponding locations in the demodulated data in other channels to determine whether said error locations are correct or not; and data selecting means for selecting one of said plurality of channels on the basis of said numbers of erroneous symbols and results of the determination made by said data comparing means.

2. The diversity reception apparatus according to claim 1, wherein when all data in said error locations estimated in the demodulated data in one channel of said plurality of channels respectively differ from the data in the corresponding locations in the demodulated data in all other channels, said data comparing means determines that said error locations in said one channel are correct.

3. The diversity reception apparatus according to claim 1, wherein when all data in said error locations estimated in the demodulated data in one channel of said plurality of channels respectively differ from the data in the corresponding locations in the demodulated data in at least one of other channels, said data comparing means determines that said error locations in said one channel are correct.

4. The diversity reception apparatus according to claim 1, wherein when data whose number is equal to or larger than a predetermined threshold in the data in said error locations estimated in the demodulated data in one channel of said plurality of channels respectively differ from the data in the corresponding locations in the demodulated data in at least one of other channels, said data comparing means determines that said error locations in said one channel are correct.

5. The diversity reception apparatus according to claim 1, wherein said error estimating means estimates error locations in the demodulated data in each channel bit by bit, and when all bits in said error locations estimated in the demodulated data in one channel of said plurality of channels respectively differ from the bits in the corresponding locations in the demodulated data in at least one of other channels, said data comparing means determines that said error locations in said one channel are correct.

6. The diversity reception apparatus according to claim 5, further comprising bit inverting means for inverting the bits in said error locations in the demodulated data in the channel selected by said data selecting means when said number of erroneous symbols is equal to or smaller than a given value.

7. The diversity reception apparatus according to claim 6, wherein said bit inverting means does not perform the bit inversion when said number of erroneous symbols exceeds the given value.

8. The diversity reception apparatus according to claim 1, wherein said error estimating means estimates said error locations in the demodulated data in each channel bit by bit, and when bits whose number is equal to or larger than a predetermined threshold in the bits in said error locations estimated in the demodulated data in one channel of said plurality of channels respectively differ from the bits in the corresponding locations in the demodulated data in at least one of other channels, said data comparing means determines that said error locations in said one channel are correct.

9. The diversity reception apparatus according to claim 1, wherein said data selecting means selects a channel in which said number of erroneous symbols is the smallest.

10. The diversity reception apparatus according to claim 1, wherein when said numbers of erroneous symbols are the smallest in a plurality of said channels, said data selecting means selects a channel in which said error locations are determined to be correct by said data comparing means from among the plurality of said channels in which said numbers of erroneous symbols are the smallest.

11. The diversity reception apparatus according to claim 1, wherein when said numbers of erroneous symbols are equal in all said channels, said data selecting means selects a channel in which said error locations are determined to be correct by said data comparing means.

12. The diversity reception apparatus according to claim 1, wherein the number of said channels of said demodulated data is two, and when said numbers of erroneous symbols are equal in the two channels and said error locations in the two channels are both determined to be correct by said data comparing means, said data selecting means maintains the preceding selection.

13. The diversity reception apparatus according to claim 1, wherein the number of said channels of said demodulated data is two, and when said numbers of erroneous symbols are equal in the two channels and said error locations in the two channels are both determined to be incorrect by said data comparing means, said data selecting means maintains the preceding selection.

14. The diversity reception apparatus according to claim 1, wherein when said data comparing means determines that said error locations in a plurality of said channels are correct, said data selecting means selects a channel in which said number of erroneous symbols is the smallest from among the plurality of said channels in which said error locations are determined to be correct.

15. The diversity reception apparatus according to claim 1, wherein when said data comparing means determines that all of said error locations in each of said channels are not correct, said data selecting means selects a channel in which said number of erroneous symbols is the smallest.

16. The diversity reception apparatus according to claim 1, wherein said error estimating means estimates the number of erroneous symbols and error locations thereof for each block defined by dividing the demodulated data in each channel to given length, and said data selecting means selects one of said plurality of channels for each said block.

17. The diversity reception apparatus according to claim 1, further comprising data detecting means for determining whether the demodulated data in each of said plurality of channels is valid or invalid, and said data selecting means selects one of the channels determined to be valid by said data detecting means from among said plurality of channels.

18. The diversity reception apparatus according to claim 17, wherein said data detecting means is unique word detecting means for detecting particular data pattern in said demodulated data.

19. The diversity reception apparatus according to claim 1, wherein said modulated signal is a chirp PSK signal obtained by multiplying the phase-shift keying signal by a chirp signal whose frequency is swept at the same period as the symbol period, and said demodulating means includes subband filtering means for extracting part of the band of said modulated signal and differential detecting means for differentially detecting an output of said subband filtering means.

20. A diversity reception apparatus receiving one or a plurality of modulated signals modulated with error correctably coded data, comprising:

demodulating means for demodulating said modulated signal(s) to obtain demodulated data in a plurality of channels corresponding to said coded data;

error correcting means for estimating the number of erroneous symbols and error locations thereof in the demodulated data in each channel, and for correcting an error in the demodulated data in each channel on the basis of said error locations and outputting the error-corrected demodulated data as decoded data;

data comparing means for comparing the data in said error locations estimated in the decoded data in each channel with the data in the corresponding locations in the decoded data in other channels to determine whether said error locations are correct or not; and data selecting means for selecting one of said plurality of channels on the basis of said numbers of erroneous symbols and results of the determination made by said data comparing means.

21. The diversity reception apparatus according to claim 20, wherein when all data in said error locations estimated in the decoded data in one channel of said plurality of channels are respectively equal to the data in the corresponding locations in the decoded data in all other channels, said data comparing means determines that said error locations in said one channel are correct.

22. The diversity reception apparatus according to claim 20, wherein when all data in said error locations estimated in the decoded data in one channel of said plurality of channels are respectively equal to the data in the corresponding locations in the decoded data in at least one of other channels, said data comparing means determines that said error locations in said one channel are correct.

23. The diversity reception apparatus according to claim 20, wherein when data whose number is equal to or larger than a predetermined threshold in the data in said error locations estimated in the decoded data in one channel of said plurality of channels are respectively equal to the data in the corresponding locations in the decoded data in at least one of other channels, said data comparing means determines that said error locations in said one channel are correct.

24. The diversity reception apparatus according to claim 20, wherein said error correcting means does not perform the error correction when said number of erroneous symbols exceeds a given value.

25. The diversity reception apparatus according to claim 20, wherein said data selecting means selects a channel in which said number of erroneous symbols is the smallest.

26. The diversity reception apparatus according to claim 20, wherein when said numbers of erroneous symbols are the smallest in a plurality of said channels, said data selecting means selects a channel in which said error locations are determined to be correct by said data comparing means from among the plurality of said channels in which said numbers of erroneous symbols are the smallest.

27. The diversity reception apparatus according to claim 20, wherein when said numbers of erroneous symbols are equal in all of said channels, said data selecting means selects a channel in which said error locations are determined to be correct by said data comparing means.

28. The diversity reception apparatus according to claim 20, wherein the number of said channels of said demodulated data is two, and when said numbers of erroneous symbols are equal in the two channels and said error locations in the two channels are both determined to be correct by said data comparing means, said data selecting means maintains the preceding selection.

29. The diversity reception apparatus according to claim 20, wherein the number of said channels of said demodulated data is two, and when said numbers of erroneous symbols are equal in the two channels and said error locations in the two channels are both determined to be incorrect by said data comparing means, said data selecting means maintains the preceding selection.

30. The diversity reception apparatus according to claim 20, wherein when said data comparing means determines that said error locations in a plurality of said channels are correct, said data selecting means selects a channel in which said number of erroneous symbols is the smallest from among the plurality of said channels in which said error locations are determined to be correct.

31. The diversity reception apparatus according to claim 20, wherein when said data comparing means determines that said error locations are incorrect in all of said channels, said data selecting means selects a channel in which said number of erroneous symbols is the smallest.

32. The diversity reception apparatus according to claim 20, wherein said error correcting means estimates the number of erroneous symbols and error locations thereof for each block defined by dividing the demodulated data in each channel to given length, and said data selecting means selects one of said plurality of channels for each said block.

33. The diversity reception apparatus according to claim 20, further comprising data detecting means for determining whether the demodulated data in each of said plurality of channels is valid or invalid, and said data selecting means selects one of the channels determined to be valid by said data detecting means from among said plurality of channels.

34. The diversity reception apparatus according to claim 33, wherein said data detecting means is unique word detecting means for detecting particular data pattern in said demodulated data.

35. The diversity reception apparatus according to claim 20, wherein said modulated signal is a chirp PSK signal obtained by multiplying the phase-shift keying signal by a chirp signal whose frequency is swept at the same period as the symbol period, and said demodulating means includes subband filtering means for extracting part of the band of said modulated signal and differential detecting means for differentially detecting an output of said subband filtering means.

36. A diversity reception apparatus receiving one or a plurality of modulated signals modulated with error correctably coded data, comprising:

demodulating means for demodulating said modulated signal(s) to obtain demodulated data in a plurality of channels corresponding to said coded data;

error estimating means for estimating an error location in the demodulated data in each channel;

data comparing means for comparing the data in said error location estimated in the demodulated data in each channel with the data in the corresponding location in the demodulated data in other channels to determine whether said error location is correct or not; and data selecting means for selecting a channel in which said error location is determined to be correct by said data comparing means from among said plurality of channels.

* * * * *